Figure 1:
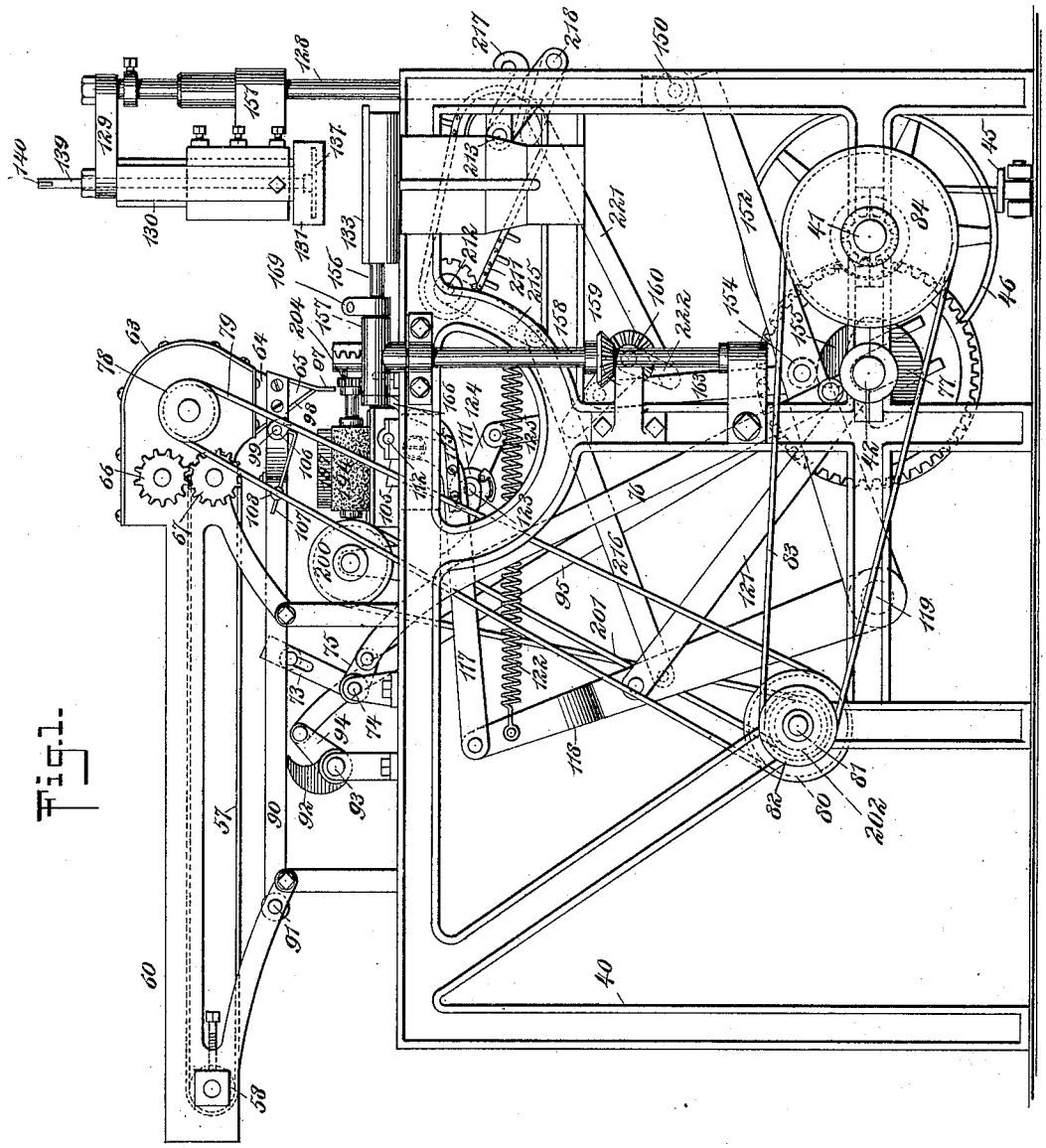

(No Model.) 10 Sheets—Sheet 1.
J. H. SCHMIDT.
CIGARETTE MAKING MACHINE.

No. 603,488. Patented May 3, 1898.

WITNESSES:
William P. Goebel.
E. Jos. Belknap

INVENTOR
Julius H. Schmidt,
BY
Chas. C. Gill
ATTORNEY.

(No Model.) 10 Sheets—Sheet 4.

J. H. SCHMIDT.
CIGARETTE MAKING MACHINE.

No. 603,488. Patented May 3, 1898.

WITNESSES:
William P. Goebel.
E. Jos. Belknap.

INVENTOR
Julius H. Schmidt,
BY
Chas. C. Gill
ATTORNEY.

(No Model.) 10 Sheets—Sheet 5.

J. H. SCHMIDT.
CIGARETTE MAKING MACHINE.

No. 603,488. Patented May 3, 1898.

WITNESSES:
William P. Goebel.
E. Jos. Belknap.

INVENTOR
Julius H. Schmidt,
BY
Chas. C. Gill
ATTORNEY.

(No Model.) 10 Sheets—Sheet 6.
J. H. SCHMIDT.
CIGARETTE MAKING MACHINE.
No. 603,488. Patented May 3, 1898.
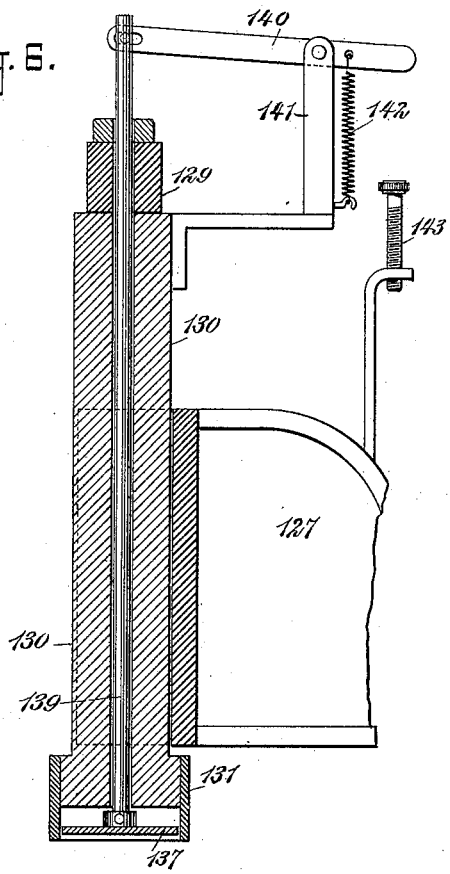
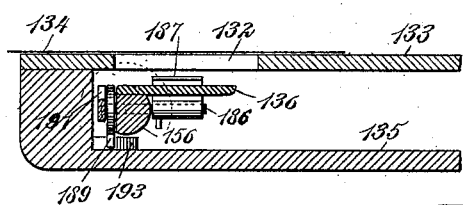
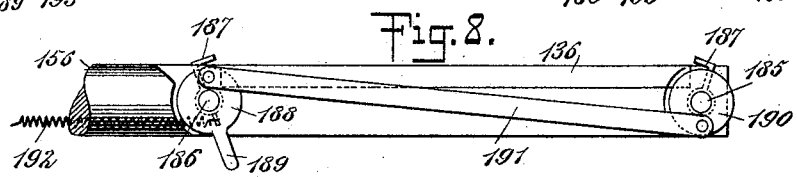
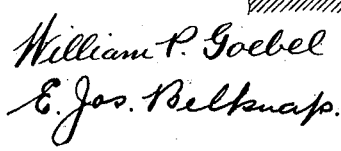
WITNESSES:
William P. Goebel
E. Jos. Belknap.
INVENTOR
Julius H. Schmidt,
BY
Chas. E. Gill
ATTORNEY.
THE NORRIS PETERS CO., PHOTO-LITHO., WASHINGTON, D. C.

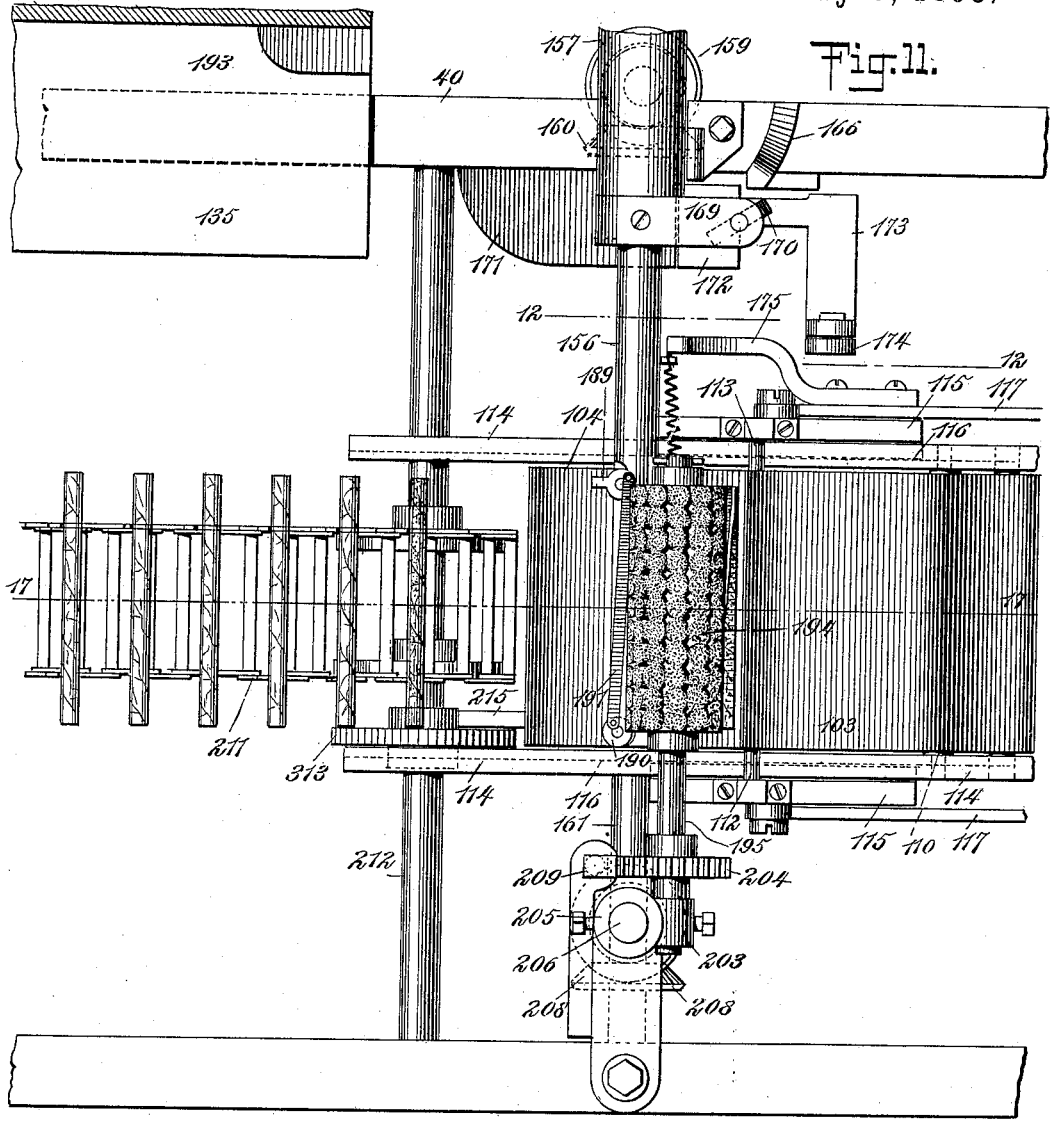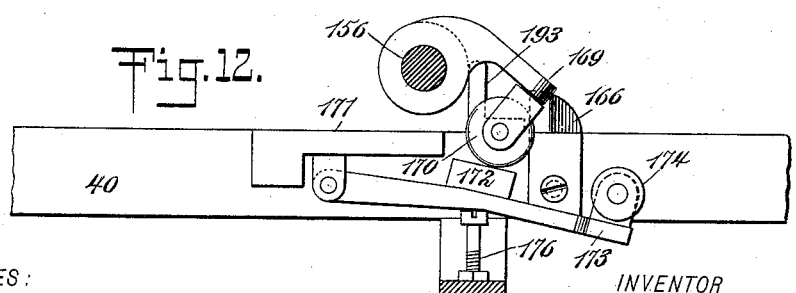

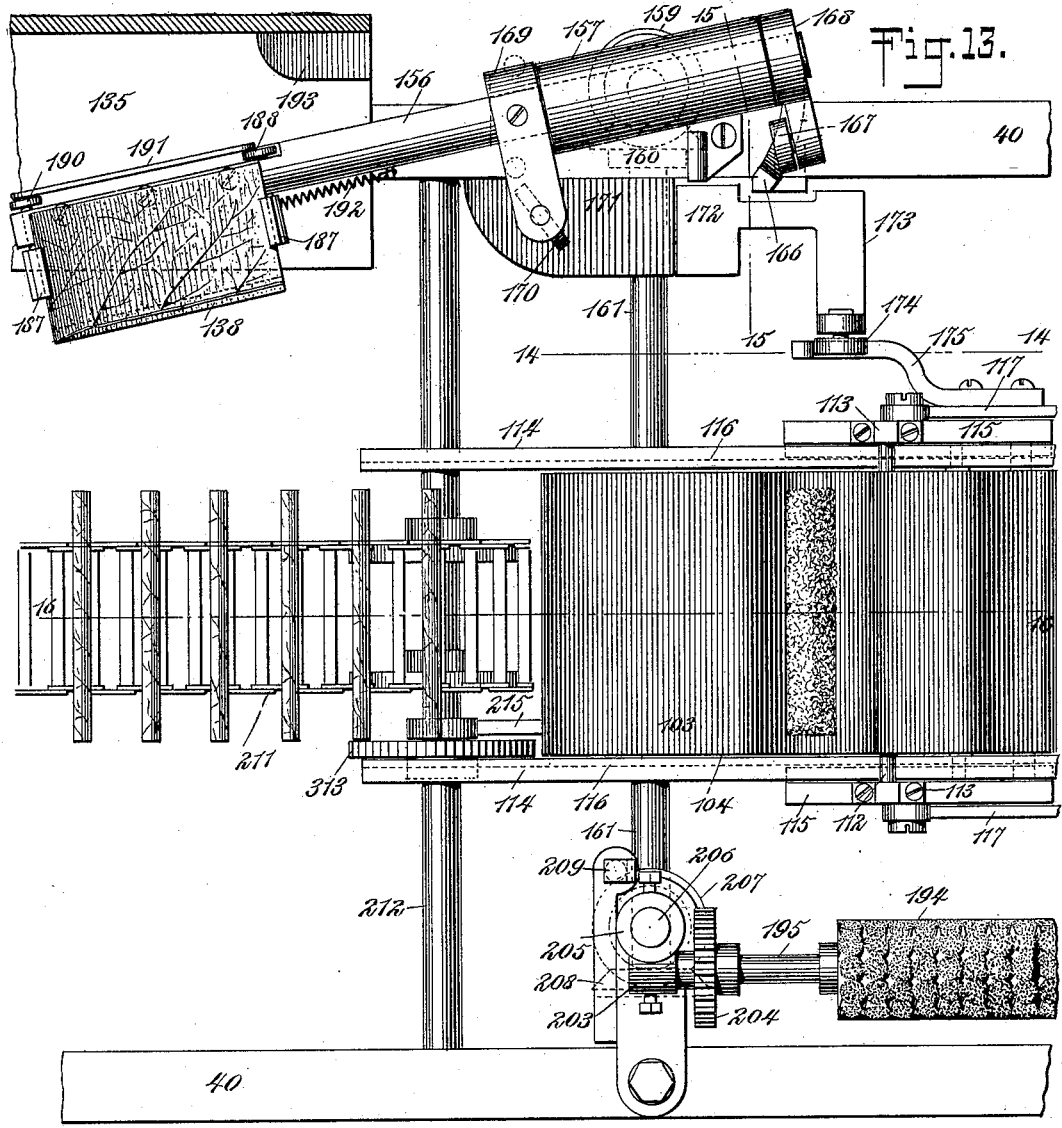

(No Model.)  10 Sheets—Sheet 9.
J. H. SCHMIDT.
CIGARETTE MAKING MACHINE.
No. 603,488.  Patented May 3, 1898.
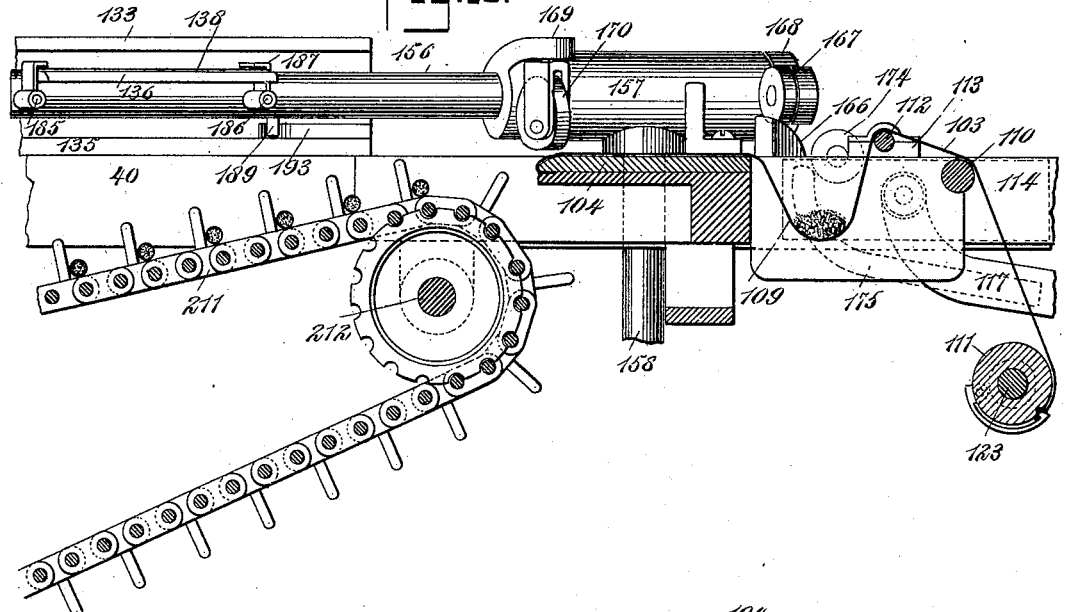
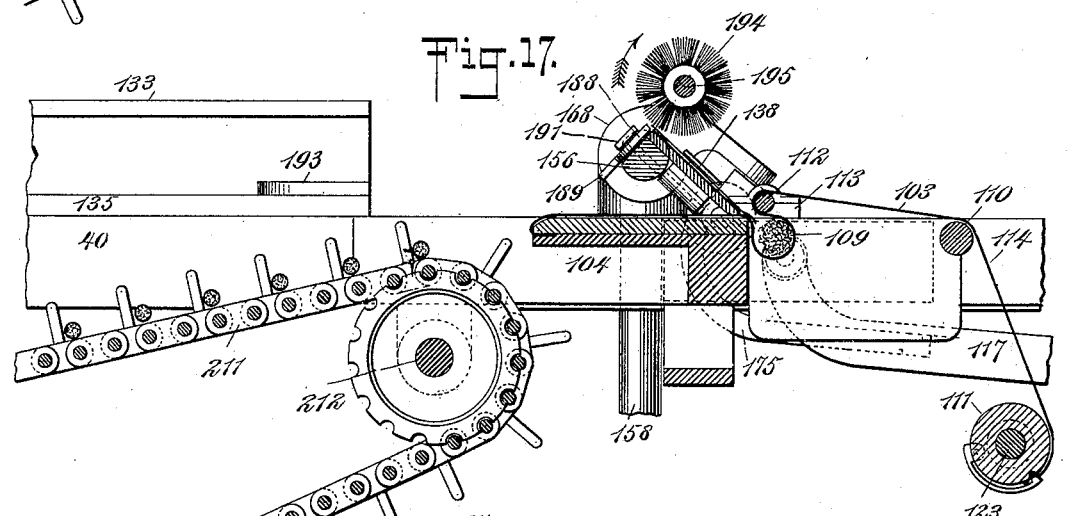
WITNESSES:  
William P. Goebel.  
E. Jos. Belknap.
INVENTOR  
Julius H. Schmidt,  
BY Chas. C. Gill  
ATTORNEY (No Model.) 10 Sheets—Sheet 10.
J. H. SCHMIDT.
CIGARETTE MAKING MACHINE.
No. 603,488. Patented May 3, 1898.
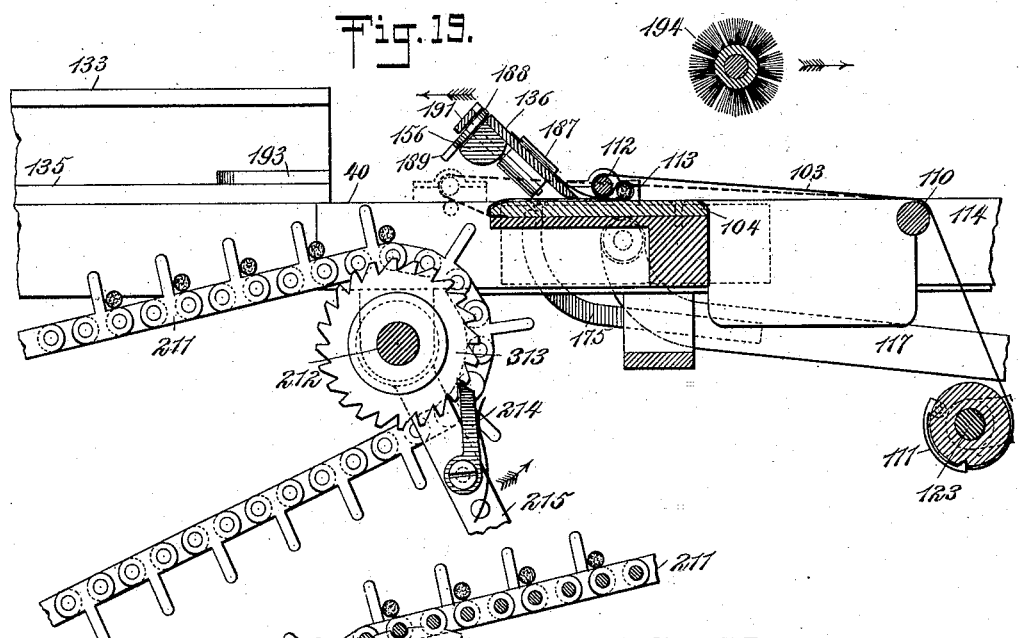
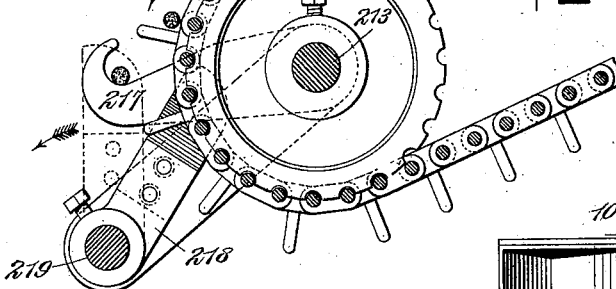
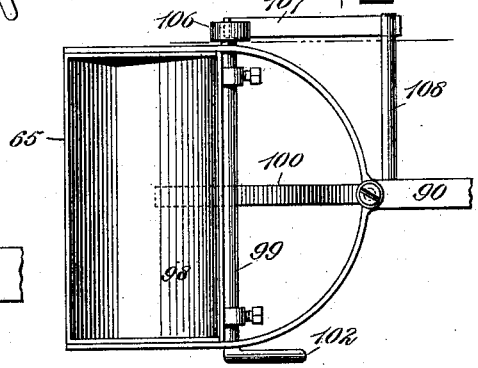
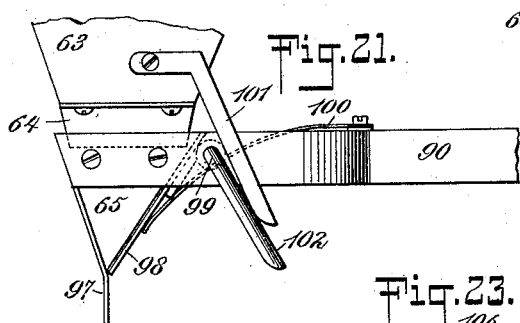
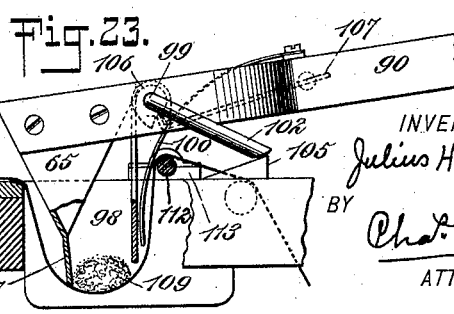
WITNESSES:
William P. Goebel.
E. Jos. Belknap.
INVENTOR
Julius H. Schmidt,
BY
Chas. E. Gill
ATTORNEY.
THE NORRIS PETERS CO., PHOTO-LITHO., WASHINGTON, D. C.

UNITED STATES PATENT OFFICE.

JULIUS H. SCHMIDT, OF BAYONNE, NEW JERSEY, ASSIGNOR TO JOHN C. RYER, OF SAME PLACE.

CIGARETTE-MAKING MACHINE.

SPECIFICATION forming part of Letters Patent No. 603,488, dated May 3, 1898.

Application filed July 20, 1897. Serial No. 645,232. (No model.)

*To all whom it may concern:*

Be it known that I, JULIUS H. SCHMIDT, a citizen of the United States, and a resident of Bayonne, in the county of Hudson and State of New Jersey, have invented certain new and useful Improvements in Cigarette-Making Machines, of which the following is a specification.

The invention relates to improvements in cigarette-making machines; and it consists in the novel features and combinations of parts, with certain details of construction, hereinafter fully described, and particularly pointed out in the claims.

The machine which is the subject hereof is illustrated in the operation of rolling all-tobacco cigarettes; but I do not confine the invention in every instance to the use of a tobacco wrapper or binder nor to the manufacture of cigarettes of any special length or diameter, nor is the invention confined to rolling what are technically known in law and commerce as "cigarettes," since the filler and wrapper or binder may be of larger proportions than those required for the usual cigarette, and under such conditions the product would ordinarily be termed "cigars" or bear other trade designations.

The machine embodying the invention made the subject of this application comprises automatic mechanism for feeding and disintegrating the filler-tobacco, a charge-box moving between the tobacco-feeding mechanism and the rolling-apron for the purpose of transporting the charges of filler-tobacco to said apron, means for cutting the wrappers and conveying the same to the rolling-apron, means for applying paste to the edge of the wrappers while in position over the rolling-apron, means for closing the pocket of the rolling-apron and drawing upon the rear end of said apron for the purpose of reducing the pocket in the apron down to the proper size to roll the cigarettes, means for receiving the cigarettes as they are one after another rolled from the front end of the rolling-bed and conveying said cigarettes to the trimming-knives by which the ends of the cigarettes are trimmed, and suitable mechanism for actuating the various parts of the machine, and all of which will be hereinafter specifically described.

The invention will be fully understood from the detailed description hereinafter presented, reference being had to the accompanying drawings, in which—

Figure 2:
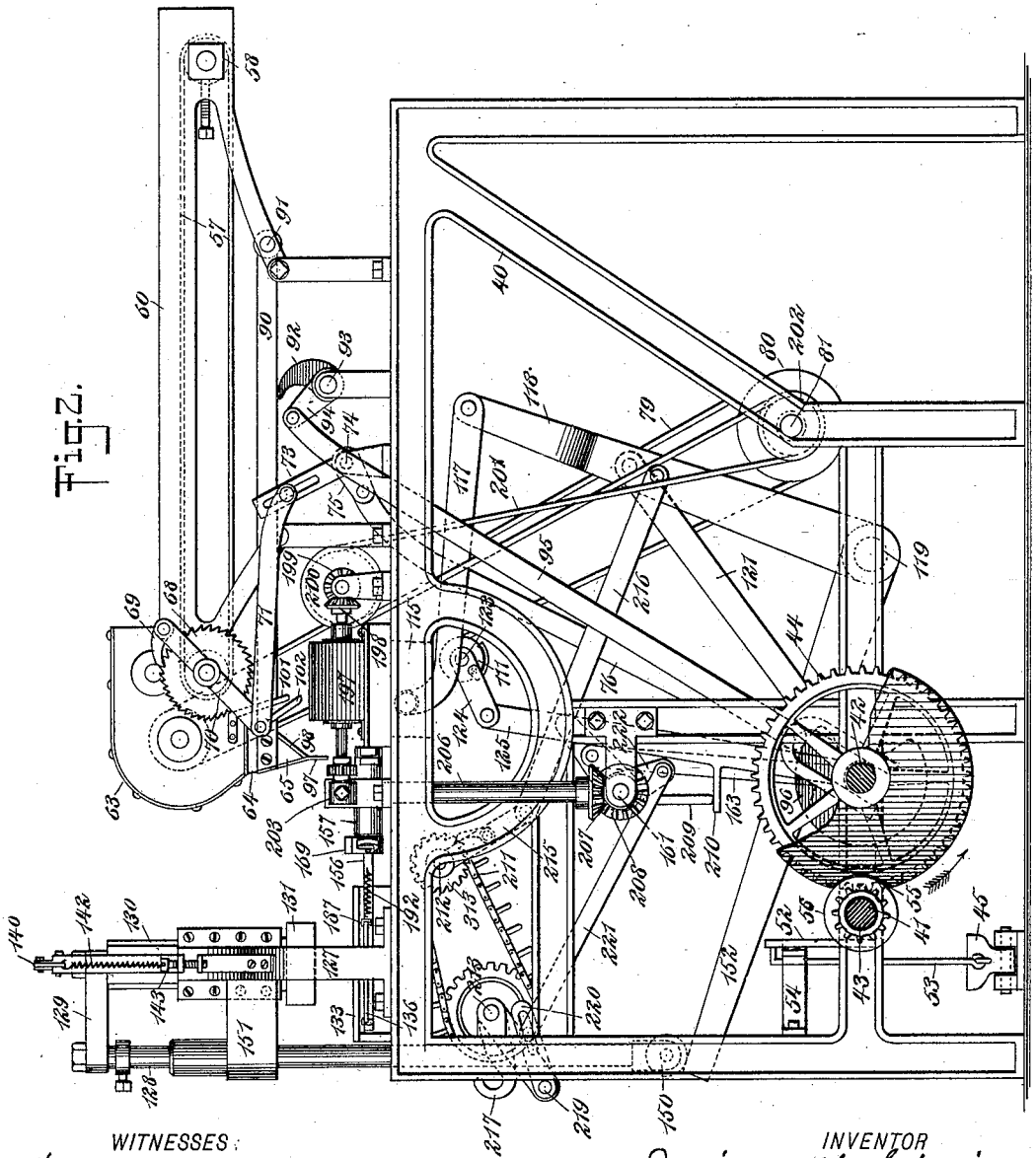
Figure 3:
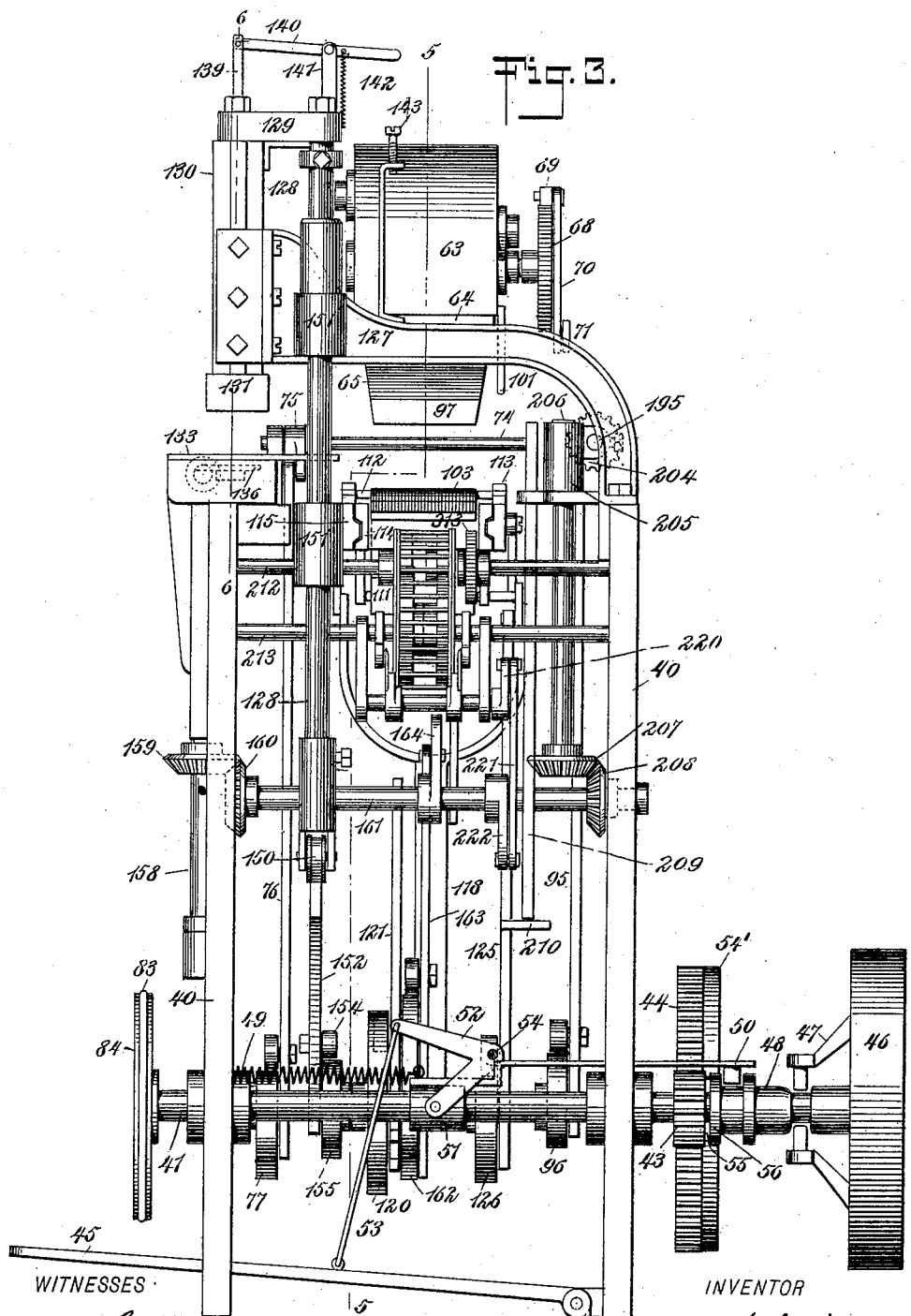
Figure 4:
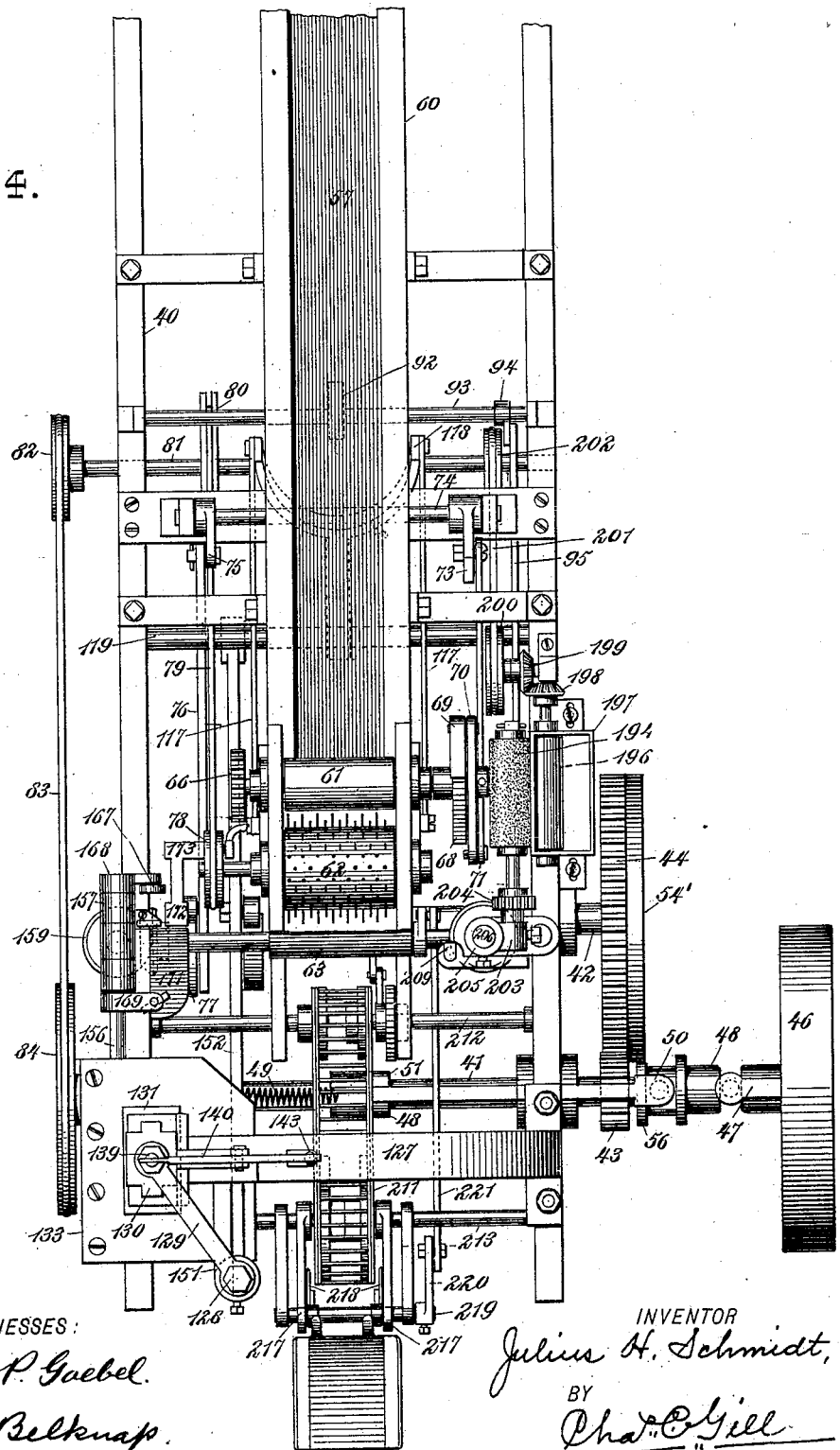
Figure 5:
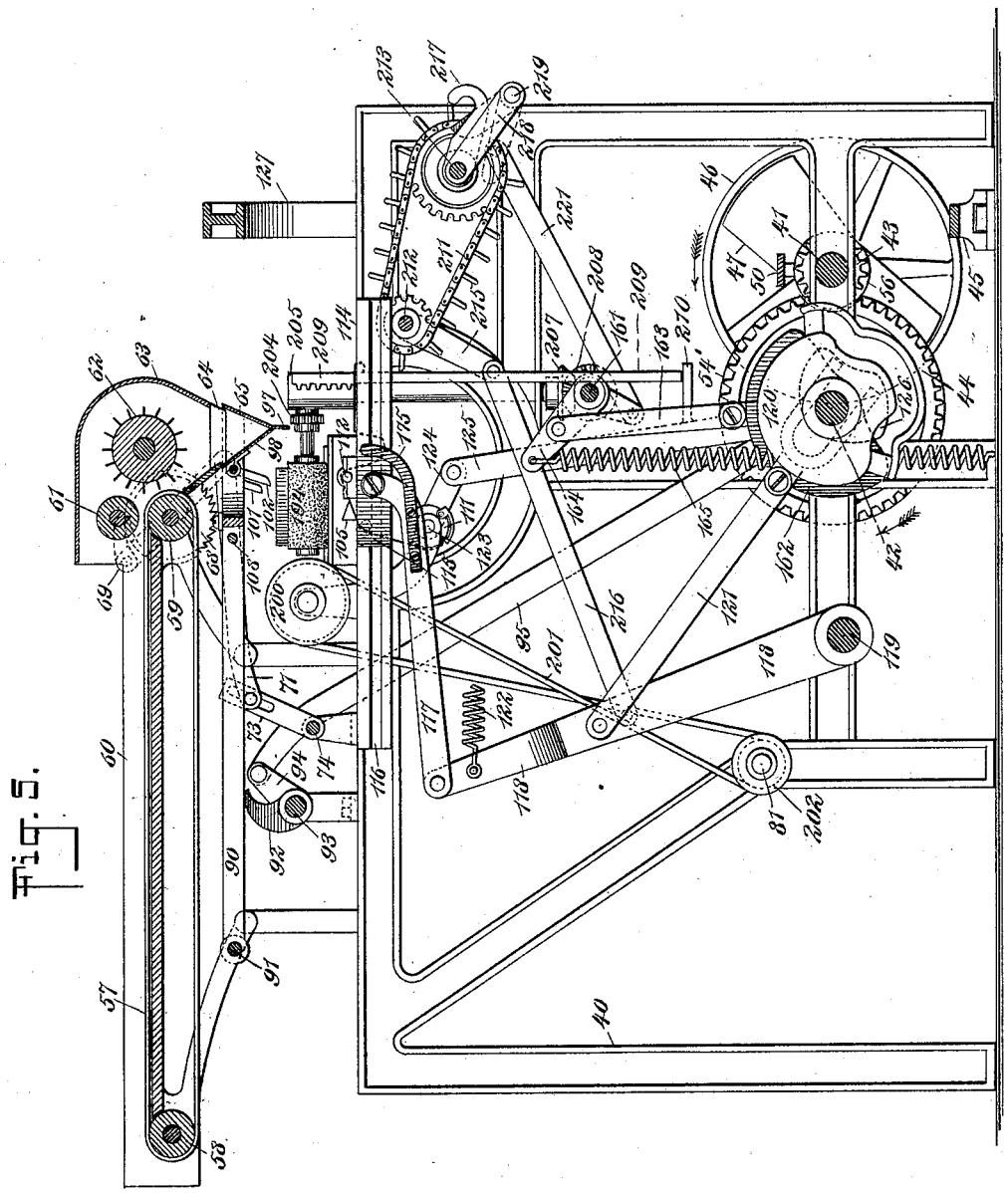

Figure 1 is a side elevation of a machine constructed in accordance with and embodying the invention, this elevation having been taken from the left-hand side of the machine. Fig. 2 is a like view of the right-hand side of the machine, the belt-wheel being omitted and the driving and cam shafts being in section. Fig. 3 is a front view of same. Fig. 4 is an enlarged top view, partly broken away, of same. Fig. 5 is a vertical longitudinal section of same on the dotted line 5 5 of Fig. 3. Fig. 6 is an enlarged vertical section on the dotted line 6 6 of Fig. 3 through the punch and die for cutting the wrappers and delivering the same to the wrapper-carrier. This figure shows the punch-and-die mechanism in its normal position with the leaf extended over the die preparatory to the cutting of the wrapper therefrom. Fig. 7 is a like section of same, but illustrating the punch in its lower position, having cut the wrapper from the leaf, and the interior platen in its lower position below the punch, said platen having driven the cut wrapper downward upon the wrapper-carrier. Fig. 8 is an enlarged elevation of the outer side of the wrapper-carrier and illustrates more particularly the clips which hold the cut wrapper upon the carrier and the means employed for insuring simultaneous motion to said clips. Fig. 9 is a detached sectional view through a portion of the wrapper-carrier and illustrating in section one of the clips which hold the wrapper upon the wrapper-carrier during the movement of the latter from the die to the rolling-apron. This figure shows the clip in its open position and the cam by which it is held in its open position through the medium of the crank-arm upon the shaft carrying said clip. Fig. 10 is a like view of same, but showing the clip in its closed position, in which position it binds against the wrapper upon the wrapper-carrier. Fig. 11 is an enlarged top view of a portion of the machine and illustrates more particularly the rolling-apron, pressure-roller, the wrapper-carrier, and the paste-roller, the wrapper-carrier and the paste-roller being at their inward position over the rolling-apron ready to deliver the wrapper to the apron and to apply a line of paste to the outer edge of said wrapper. Fig. 12 is a detached sectional view on the dotted line 12 12 of Fig. 11. Fig. 13 is a view corresponding with Fig. 11 and shows the charge of filler-tobacco in the pocket of the apron and the wrapper-carrier as having started on its inward movement to deliver the cut wrapper to said apron, while in Fig. 11 the wrapper-carrier is shown as having reached its inward position and the pasting-brush is also shown at its inward position, the outer position of the pasting brush or roller being illustrated in Fig. 13. Fig. 14 is a detached sectional view on the line 14 14 of Fig. 13. Fig. 15 is a detached sectional view on the dotted line 15 15 of Fig. 13. Fig. 16 is an enlarged longitudinal section of the machine on the dotted line 16 16 of Fig. 13. Fig. 17 is an enlarged longitudinal section of the machine on the dotted line 17 17 of Fig. 11 and shows the wrapper-carrier and paste-roller at their inward position with the filler-tobacco closed in the loop of the rolling-apron. Fig. 18 is a detached sectional view of a portion of the machine, taken on the line 17 17 of Fig. 11 and showing the loop in the rolling-apron as having been drawn down to proper size by the revoluble roller, to which the rear end of said apron is connected. Fig. 19 is an enlarged view of a portion of the machine and showing in side elevation the means for actuating the cigarette carrier-chain and in central vertical section the rolling-bed with the apron thereon and the pressure-roller as traveling forward to roll the cigarette. This figure also shows the paste-roller as retreating from the wrapper-carrier and the wrapper-carrier as retreating from the pressure-roller and leaving the cut wrapper upon said apron. Fig. 20 is an enlarged central vertical longitudinal section through the lower portion of the cigarette chain carrier and illustrating more particularly the knives by which the ends of the cigarette are trimmed as the cigarettes, one after another, fall from said carrier. Fig. 21 is a detached side elevation of the charge-box by which the charges of filler-tobacco are transported from the feed mechanism to the rolling-apron. This figure also shows a detached portion of the chute which directs the filler-tobacco to the said charge-box, and the said charge-box is shown in its upward position against said chute and with its door closed. Fig. 22 is a detached top view of the charge-box and connected parts. Fig. 23 is a detached view, partly broken away and partly in central section, of the rolling-bed, with the apron thereon, and the charge-box, the latter being shown in its lower position with its door open and having discharged the filler-tobacco into the pocket of said apron, which pocket in the operation of this machine is formed by the charge-box on its descent to its lower position; and Fig. 24 is a detached sectional view of a spring and notched plate, which are utilized when the charge-box is in its lower position to lock the door of said box open, as shown in Fig. 23.

In the drawings, 40 denotes the main general supporting-frame for the machine; 41, the main driving-shaft; 42, the auxiliary driving-shaft; 43, a pinion on the main driving-shaft 41, and 44 a gear-wheel upon the auxiliary driving-shaft 42 and which is engaged by said pinion 43 and communicates motion from the main driving-shaft 41 to the auxiliary driving-shaft 42.

In the employment of the machine made the subject hereof the driving-shaft 41 comes to a full stop at the end of each of its revolutions and is started to make its revolution by the operator pressing upon the foot-treadle 45, which is clearly shown in Fig. 3. Upon the outer right-hand end of the main driving-shaft 41 is the belt or power wheel 46 and the usual friction-clutch 47, (see Fig. 3,) the latter being operated from the clutch-sleeve 48, adapted to slide upon said shaft 41 and to be moved toward the pinion-wheel 43 by means of the spring 49 and toward the belt-wheel 46 by the pressure of the foot upon the treadle 45. The sleeve 48 is grooved to receive the projection upon the end of the horizontal bar 50, which at its left-hand end is secured to a slide 51 on the main driving-shaft 41, and to this slide 51 is pivotally secured one arm of the bell-crank lever 52, whose other arm is by means of the rod 53 connected with the foot-treadle 45.

The bell-crank lever 52 at its angle is secured to a rigid standard 54, and hence when the foot of the operator is pressed upon the outer end of the treadle 45 the rod 53 will pull the upper arm of the bell-crank lever 52 downward and at the same time move the lower end of said rod outward to the right, this having the effect of moving the slide 51 to the right and causing the bar 50 to drive the clutch-sleeve 48 against the pins of the clutch, with the result that the clutch will bind against the wheel 46 in the usual manner, and thus fasten the power-wheel 46 and driving-shaft 41 together for the purpose of permitting said belt-wheel 46 to communicate its motion to the shaft 41 and, through the pinion 43 and gear-wheel 44, to the auxiliary driving-shaft 42. The outer edge of the periphery of the gear-wheel 44 is formed with the flange 54', which at one point is formed with the recess 55, the latter being of a size to snugly receive the edge of the collar 56, formed on the clutch-sleeve 48. When the clutch-sleeve 48 is at its inward position close to the pinion-wheel 43, the said collar 56 will have its rear side within the recess 55 of the rim or flange 54', formed on the gear-wheel 44, and when said clutch-sleeve 48 is driven outward by the pressure of the foot upon the treadle 45 the collar 56 of said clutch-sleeve will pass outward beyond the rim or flange 54' on the gear-wheel 44. During all of the time that the pressure of the foot is on the treadle 45 the clutch-sleeve 48 will remain in its outward position, but when the pressure of the foot is removed from the treadle 45 the spring 49 will, by acting through the bar 50, exert a tension on the clutch-sleeve 48, pulling it toward the pinion-wheel 43. When the pressure of the foot of the operator is applied to the treadle 45, the clutch-sleeve 48 is driven outward and the power of the belt-wheel 46 is imparted to the driving-shaft 41 and, through the gear-wheels 43 and 44, to the auxiliary driving-shaft 42, and thus the first pressure of the foot upon the treadle 45 will drive the collar 56 on the clutch-sleeve 48 outward from the recess 55 and start the shafts 41 and 42 in motion. As soon as the recess 55 in the rim 54' of the gear-wheel 44 has turned beyond the clutch-sleeve 48 the operator may remove her foot from the treadle 45, since upon doing so the spring 49 will draw the clutch-sleeve 48 toward the pinion-wheel 43, but will not stop the machine at this time, since the edge of the collar 56 of said clutch-sleeve 48 will come against the rim 54' and be thereby held in its outward position, riding on said rim until the auxiliary driving-shaft 42 has made a complete revolution, upon completing which the recess 55 in the rim 54' will pass into alinement with the clutch-sleeve 48, and the spring 49 will instantly draw said sleeve toward the pinion-wheel 43 and the collar 56 into the recess 55, thereby relieving the clutch 47 and cutting off the power of the wheel 46 from the driving-shaft 41.

The machine is stopped at each revolution of the driving-shaft 42 by reason of the fact that the recess 55 at the end of each revolution of said shaft comes into alinement with the collar 56 of the clutch-sleeve 48 and that the spring 49 is enabled by reason of said recess 55 to pull the sleeve 48 inward toward the pinion-wheel 43. The recess 55 in the rim 54' of the gear-wheel 44 enables the collar 56 to lock the gear-wheel 44 and shaft 42 at the end of each of its revolutions, and thus the momentum of the moving parts of the machine is prevented from carrying the shaft 42 beyond its full revolution, and this feature becomes important since it is desirable at the end of each revolution of the driving-shaft 42 to arrest all of the parts of the machine in a definite relation one to the other. The machine is restarted by the pressure of the foot upon the treadle 45 driving the clutch-sleeve 48 outward, and is automatically stopped by the operation of the spring 49 drawing the clutch-sleeve 48 inward toward the pinion-wheel 43, and at each stoppage of the machine the clutch-sleeve 48 has its collar 56 enter the recess 55 and lock the gear-wheel 44 and the parts operated therefrom.

The mechanism for feeding the filler-tobacco is more clearly illustrated in Figs. 1 to 5, inclusive, in which 57 denotes an endless feed-belt, upon which the filler-tobacco is spread in an even layer by hand and which is mounted upon the rollers 58 and 59. The feed-belt 57 is inclosed at opposite sides by the side frames 60, which with said belt 57 constitute a trough through which the filler-tobacco is fed inward. Above the inner roller 59 is mounted the pressure-roller 61, below which the layer of filler-tobacco must pass and by which it is compacted. In advance of the rollers 59 and 61 there is mounted the picker-roller 62, which acts against the protruding portion of the filler-tobacco and thoroughly disintegrates the same in a well-known manner.

The picker-roller 62 and pressure-roller 61 are covered by a metal hood 63, the lower end of which forms a chute 64, by which the disintegrated tobacco is directed to a charge-box 65, by which in proper quantities the same is delivered to the rolling-apron hereinafter described. The shaft of the pressure-roller 61 is provided at its left-hand end (see Fig. 1) with a gear-wheel 66, which is engaged by the gear-wheel 67, secured upon the left-hand end of the shaft of the roller 59, and thus the rollers 61 and 59 have a simultaneous motion toward one another for the purpose of drawing the layer of tobacco inward between them and toward the picker-roller 62. The picker-roller 62 has during the revolution of the main driving-shaft 41 a constant revoluble motion imparted to it, while the rollers 59 and 61 have an intermittent motion, said rollers turning but once while the main driving-shaft 41 makes one revolution.

The mechanism for imparting an intermittent motion to the roller 59 and through the gear-wheels 67 and 66 to the roller 61 is more clearly illustrated in Fig. 2, in which it will be seen that upon the right-hand end of the shaft of the roller 59 is secured a ratchet-wheel 68, which is engaged by the pawl 69, carried upon the pivotally-mounted arm 70, whose lower end is pivotally connected to the rod 71, which is pivotally secured to the upper end of the arm 73, carried by the right-hand end of the rock-shaft 74, which is mounted in suitable bearings above the bed-plate of the machine and at its left-hand end is provided with the short crank-arm 75, which receives the upper end of the rod 76 and is actuated thereby. The rod 76 extends downward and forward, as shown in Figs. 1 and 2, and is bifurcated at its lower end to straddle the shaft 42. The rod 76 carries a small roller which is engaged by the cam 77 on the driving-shaft 42, which cam, owing to its form, effects the vertical reciprocation of the said rod 76, and thereby the rocking of the rock-shaft 74, which by the movement of its arm 73 operates the rod 71 and pawl-arm 70, the latter during the forward movement of its upper end driving the pawl 69 against the teeth of the ratchet-wheel 68 and turning the roller 59 at the front end of the feed-belt 57 and during its rearward motion simply dragging the pawl 69 over the teeth of said ratchet 68 without affecting the latter. The cam 77 positively moves the rod 76 upward, and during this upward movement of said rod 76 the pawl 69 drives the ratchet 68 and turns the roller 59, and through the gear-wheels 67 66 also turns the pressure-roller 61. The downward movement of the rod 76, by which the parts intermediate said rod and pawl 69 are restored to their former normal position, is effected solely by the weight of the arm 76, which will move downward when the surface of the cam 77 permits it to do so. The rod 76 has a reciprocating motion which through the intermediate connections imparts to the pawl-arm 70 an oscillating motion, and thus the pawl 69 is enabled, through the ratchet-wheel 68, to impart an intermittent motion to the roller 59, pressure-roller 61, and belt 57, and thus the tobacco is fed inward by intermittent motions to the picker-roller 62. The throw of the pawl 69 governs the extent of the intermittent movements of the feed-belt 57, and the throw of the pawl 69 may be adjusted to suit the requirements by setting the rear end of the rod 71 at the proper elevation in the slotted upward end of the arm 73. While the feed-belt 57 and pressure-roller 61 have an intermittent motion, the picker-roller 62 has a constant motion during the revolution of the driving-shaft 41, and the mechanism for imparting this constant motion to the picker-roller 62 is more clearly illustrated in Fig. 1, in which it will be seen that upon the outer end of the picker-roller shaft is secured the grooved wheel 78, which receives the cord or belt 79 and is by said cord or belt connected with the grooved wheel 80 on the shaft 81, which at its outer end is provided with the grooved wheel 82 to receive the cord or belt 83, passing rearward from the grooved wheel 84, mounted upon the left-hand end of the driving-shaft 41. The motion of the shaft 41 is communicated through the wheel 84, belt 83, and wheel 82 to the shaft 81, and from the shaft 81 motion is communicated through the wheel 80, belt 79, and wheel 78 to the picker-roller 62. Thus the picker-roller 62 has a constant revolving motion during all of the revolution of the driving-shaft 41, and said picker-roller 62 is given a rapid revolution, since it receives its motion directly from the shaft 41, to which the belt-wheel 46 is connected.

With each intermittent motion of the feed-belt 57 a sufficient quantity of filler-tobacco is fed inward between the rollers 59 61 and to the picker-roller 62 for one cigarette, and the tobacco thus fed to the picker-roller 62 is by the latter thoroughly disintegrated and falls downward into the charge-box 65, which is then in its upward position. (Illustrated in Figs. 1, 2, and 5.) The picker-roller 62 continues to rotate while the belt 57 stands still.

The charge-box 65 as to its details is more clearly illustrated in Figs. 21 to 24, inclusive, and as illustrated in Figs. 1, 2, 5, and 22 the said charge-box 65 is secured upon the front bifurcated end of the arm 90, which at its rear end is pivotally mounted at 91 and rests upon the cam 92, mounted upon the rock-shaft 93, located above the bed-plate of the machine, as clearly illustrated in Fig. 5.

The charge-box 65 is rigid with the front end of the arm 90, and the arm 90 is simply held at its rear end and has for its only support the cam 92 directly below it. The weight of the arm 90 and its connected parts serves to retain said arm upon the cam 92 and to cause the arm to follow said cam, and thus during the movement of the rock-shaft 93 and cam 92 the arm 90 is raised in order that the charge-box 65 may receive the filler-tobacco and then lowered in order that the said charge-box may deposit the filler-tobacco upon the rolling-apron.

The arm 90, as above described, receives its motion from the cam 92, and the latter is actuated from the auxiliary driving-shaft 42 through the medium of the short lever 94, secured to the right-hand end of the aforesaid rock-shaft 93, the rod 95, connected at its upper end to said short lever 94 and thence extending forward and downward and straddling the auxiliary driving-shaft 42, and the cam 96 on said shaft 42 and against which the roller carried by said rod 95 has its bearing. During the revolution of the auxiliary driving-shaft 42 the cam 96 operates to move the rod 95 upward and the short lever 94 and rock-shaft 93 rearward, whereby said rock-shaft is caused to turn the cam 92 toward the rear to the position in which it is illustrated in Figs. 1 and 5, whereby by means of said cam 92 the arm 90 and charge-box 65 are elevated to their upper position. The continued movement of the cam 96 on the auxiliary driving-shaft 42 permits the lowering of the rod 95 and arm 90, carrying the charge-box, by their own weight, the weight of the said parts being sufficient to cause them to follow the surface outline of the cam 96 without the aid of springs. The arm 90, carrying the charge-box 65, is thus forced to its upward position by the cam 96 and is permitted by the cam 96 to descend of its own weight to its lower position, which is that illustrated in Fig. 23.

The charge-box 65 is, as above described and as clearly illustrated in Figs. 21 and 22, rigidly connected to the front end of the arm 90, and said charge-box is in the shape of an inverted cone in cross-section and has an entirely open top adapted to receive the lower end of the chute 64 of the hood 63, as illustrated in Figs. 5 and 21.

The front face of the charge-box 65 has a downwardly-projecting flange 97, which, as hereinafter described, is utilized to form the pocket in the rolling-apron, and the rear face of the charge-box 65 constitutes a door 98, which hangs from the horizontal shaft 99 and extends downward, as shown in Fig. 21, to the upper edge of the flange 97. The door 98 is kept normally closed while receiving the tobacco from the chute 64 and carrying the same to the rolling-apron by a suitable spring 100, which, as shown in Fig. 21, is secured to the front portion of the rod 90 and is flexed against said door 98. Upon one side of the hood 63, covering the picker-roller 62, is provided a cam-arm 101, as clearly shown in Fig. 21, and upon one end of the shaft 99 is provided the crank-arm 102, which during the upward movement of the charge-box 65 will come into contact with the cam-arm 101 and be pushed downward to the position in which it is shown in Fig. 21, and the object of this feature of construction is to effect the closing of the door 98 when the charge-box reaches its upper position to receive another charge of tobacco for a cigarette. The door 98 of the charge-box 65 is open when the said charge-box is at its lower position, as shown in Fig. 23, and remains open during the upward movement of said charge-box 65 until the crank-arm 102 of the shaft 99 contacts with the cam-arm 101 and is thereby forced downward to effect the closing of the door 98. The crank-arm 102 on the end of the shaft 99 is utilized when the charge-box 65 is reaching its lower position to open the door 98 in order that the charge of filler-tobacco may fall from said charge-box into the loop of the rolling-apron 103, as shown in Fig. 23. The rolling-apron 103 is mounted upon the bed 104, and upon one side of the frame supporting said bed 104 is located the cam 105, (shown in Fig. 23,) against which the crank-arm 102 strikes during the downward movement of the charge-box 65. When the crank-arm 102 meets the cam 105, the end of said crank-arm is pressed upward, and the shaft 99 is thereby caused to open the door 98 rearward from the charge-box 65 and allowing the charge of filler-tobacco to escape.

It is desirable that the door 98 shall remain open during the upward movement of the charge-box 65, and hence upon the end of the shaft 99 opposite to the end carrying the crank-arm 102 is rigidly secured the notched plate 106, as shown more clearly in Figs. 22, 23, and 24, which plate coöperates with the spring 107, secured by means of an arm 108 to the main arm 90, carrying the charge-box, to retain the door 98 in its open position after said door has been entirely opened by the action of the cam 105 and crank-arm 102. When the charge-box 65 descends and its door 98 is opened to its fullest extent, as shown in Fig. 23, the bent end of the spring 107 will enter the notch of the plate 106 and hold said door in its open position and prevent the spring 100 from closing the door, and thus upon the elevation of the charge-box 65 the door 98 remains open until said charge-box reaches its upward position, upon reaching which the cam-arm 101, secured to the hood 63, will force the crank-arm 102 downward, and thereby turn the shaft 99 with sufficient force to draw the notch of the plate 106 from the spring 107 and close the door 98, as shown in Fig. 21. The crank-arm 102 and cam 105 thus open the door 98 when the charge-box is arriving at its lower position. The plate 106 and spring 107 retain the door 98 open during the upward movement of the said charge-box 65, and the cam-arm 101 and crank-arm 102 overcome the force of the spring 107 and close the door 98 when the charge-box is arriving at its upper position. During the downward travel of the charge-box 65 the door 98 is maintained in its closed position by the leaf-spring 100.

As above described, the charge-box 65 is provided with the flange 97, which extends downward and is utilized to form the loop 109 in the rolling-apron 103. Directly below the charge-box 65 the frame supporting the rolling bed and apron and adjacent parts is entirely open between its opposite sides, as shown in Fig. 23, and upon the descent of the charge-box 65 the flange 97 will move the apron downward into this open space and form the loop 109 to receive the filler-tobacco and to be drawn downward to size by the mechanism hereinafter described. The charge-box 65 thus not only delivers the charges of filler-tobacco to the rolling-apron, but forms the loop 109 in said apron to receive the filler-tobacco.

The rolling-apron 103 is rigidly secured at its front end to the rolling-bed 104, as clearly shown in Fig. 18, and at its rear end said apron 103 passes over the rod 110 and is secured to the revoluble take-up roller 111, the latter being capable of being turned to tighten up the apron 103 for the purpose of drawing the loop 109 therein down to proper size, as hereinafter explained. The apron 103 passes over the pressure-roller 112, and this pressure-roller is mounted at its opposite ends in bearings 113, which are carried at opposite sides of the frame 114 on slides 115, as clearly illustrated in Figs. 11 and 13. The slides 115 are provided upon their inner faces with longitudinal ribs which enter the grooves 116 in the sides of the frame 114, whereby said sides having the grooves 116 operate as guideways or tramways for the slides 115, carrying the pressure-roller 112. The two slides 115 are connected by the rods 117 to the upper bifurcated end of the oscillating lever 118, which imparts a reciprocating motion through the rods 117 to said slides 115 and to the pressure-roller 112, carried thereby. The oscillating arm 118 is fulcrumed at its lower end upon the shaft 119 and receives its movement from the cam 120, located on the auxiliary driving-shaft 42, through the medium of the downwardly and forwardly inclined rod 121, (see Fig. 5,) whose upper end is pivotally secured to said arm 118, and whose lower end, as indicated by dotted lines, straddles the shaft 42 and carries a roller in engagement with the periphery of the cam 120. A spring 122 is provided to keep the roller carried by the rod 121 constantly against the periphery of the cam 120. During the revolving motion of the auxiliary driving-shaft 42 the cam 120, aided by the spring 122, imparts an oscillating movement to the arm 118, and this arm, acting through the rods 117 and slides 115, imparts the proper reciprocating motion to the pressure-roller 112, the latter having a direct horizontal reciprocating motion, but timed by the cam 120 to first close the loop 109 in the apron 103, as indicated in Fig. 17, and then remain stationary for a moment while the take-up roller 111 draws the loop 109 down to proper size, as illustrated in Fig. 18, after which the pressure-roller 112 continues its forward movement and rolls the filler-tobacco within the wrapper provided for it, this portion of the movement of the pressure-roller 112 being horizontally over the rolling-table 104, supporting the front part of the apron 103.

The take-up roller 111 is mounted upon the shaft 123, which has at its right-hand end the crank-arm 124, as shown in Figs. 2 and 5, and said crank-arm 124 is pivotally connected with the upper end of the rod 125, which extends downward and straddles the driving-shaft 42, upon which a cam 126 is provided to impart the proper reciprocating motion to said rod 125, and thereby operate the crank-arm 124 to axially turn the take-up roller 111, to which the rear end of the rolling-apron 103 is secured. When the machine is in its normal condition and at rest, the take-up roller 111 will be in a position to allow the slackness in the apron 103, as indicated in Fig. 16; but after the filler-tobacco has been deposited in the pocket 109 of said apron and the pressure-roller 112 has moved forward, as shown in Fig. 17, to close said pocket 109 around the filler-tobacco the said take-up roller 111 will, through the medium of the cam 126, rod 125, and crank-arm 124, be turned to wind up the apron, as indicated in Fig. 18, whereby the slackness in the apron is removed and the pocket 109 is drawn down to the requisite size for the completion of the rolling of the cigarette. The take-up roller 111, after having drawn the pocket 109 down to the proper size for the cigarette, will remain stationary during the onward movement of the pressure-roller 112 to roll the cigarette, and after the cigarette has been fully rolled and discharged from the rolling-apron 103 the cam 126, rod 125, and crank-arm 124 will impart a reverse motion to the roller 111, causing the latter to unwind the apron from itself and allow the normal slackness in said apron to return in order that said apron may be in condition to have the pocket 109 re-formed therein to receive the subsequent charge of filler-tobacco for another cigarette to be rolled.

The mechanism for cutting the wrappers and delivering them to the rolling-apron 103 is illustrated in Figs. 1, 2, and 3, and the details of this mechanism are shown on an enlarged scale in Figs. 6 to 10, inclusive, and Figs. 11 and 13, in which it will be seen that upon the front portion of the main frame 40 of the machine is secured the standard 127, in which is mounted the vertical rod 128, (see Fig. 3,) which is adapted to have a direct vertical reciprocation and is connected at its upper end by an arm 129 to the upper end of the plunger-rod 130, whose lower end carries the punch 131, the latter being in the outline of the wrapper to be cut and adapted to coöperate with the edges of the opening 132 in the plate 133 in the cutting of the wrapper from the leaf placed upon said plate 133. In Figs. 6 and 7 the leaf is indicated by the numeral 134 and rests upon the plate 133. The plate 133 has below it a solid plate 135, and said plates 133 and 135 form an open frame into which the wrapper-carrier 136 passes to receive the wrapper cut by the punch 131. The details of wrapper-carrier 136 will be hereinafter described, and said carrier upon the descent of the punch 131 is located directly below the "opening" or "die" 132 as it may be conveniently termed. The downward movement of the rod 128 carries the punch 131 downward to cut the wrapper from the leaf 134, and said punch 131, when in its lower position, merely has its lower edge within the die 132, as indicated in Fig. 7, and since the wrapper should rest evenly upon the carrier 136 I provide the interior platen 137 for the punch 131, which platen has a more extended downward movement than the punch 131, and, as shown in Fig. 7, drives the cut wrapper numbered 138, directly upon the carrier 136. The platen 137 is in the form of a plate fitting within the outlines of the punch 131 and secured to the lower end of the rod 139, which passes through a vertical opening in the plunger-rod 130 and arm 129, as more clearly illustrated in Figs. 6 and 7, and is at its upper end pivotally connected to the lever 140, the latter being mounted in the standard 141 and connected with the spring 142, whose tension is exerted to pull upward on the platen-rod 139 and platen 137, whereby the platen 137 normally remains upward within the walls of the punch 131. During the descent of the plunger-rod 130 its lower end, acting against the collar on the platen 137, will cause the said platen and rod 139 to move downward with the punch 131; but when the punch 131, carrying the platen 137, is arriving at its lower position to cut the wrapper the outer end of the lever 140 will strike the adjustable stop 143, supported by the frame 127, and be thereby driven upward, with the result that the platen-rod 139 and platen 137 will be forced downward to the position shown in Fig. 7. During this downward movement of the platen 137 and rod 139, under the action of the lever 140 and stop 143, said platen evenly presses the cut wrapper 138 upon the carrier 136. The upward movement of the vertical rod 128 and plunger-rod 130 removes the punch 131 from the die 132 and permits the spring 142 to restore the platen 137 to its upward position within the walls of the punch 131. The standard 141, supporting the lever 140, is directly connected with the plunger-rod 130, as shown in Fig. 6, and hence during the downward movement of said plunger-rod the said standard 141 is carried downward, whereby the outer end of the lever 140 is caused to meet the upper end of the stop 143. In the present instance the stop 143 is in the form of a screw, and hence may be adjusted at will in order that the platen 137 may have just the right downward movement to evenly press the cut wrapper upon the wrapper-carrier 136. In the operation of cutting the wrappers the leaf 134 is simply spread over the plate 133 and covers the opening or die 132, and thereupon the downward movement of the punch 131 will cut the wrapper from the leaf, and the further downward movement of the platen 137 will cause the cut wrapper to be evenly deposited upon the carrier 136.

The means for effecting the vertical reciprocation of the plunger-rod 130 is illustrated more clearly in Figs. 1 and 3, in which it will be seen that the lower end of the rod 128, connected with said plunger, carries a roller 150 and is mounted in guides 151 and that the lower end of the said rod 128 has the said roller 150 resting upon the upper front end of the downwardly and rearwardly inclined lever 152, which is fulcrumed on the shaft 119 and carries a roller 154, which rests upon the cam 155, mounted upon the auxiliary driving-shaft 42. During the revolving motion of the shaft 42 and cam 155 the lever 152 ascends to elevate the rod 128 and plunger-rod 130 and descends of its own weight, combined with the weight of the connected parts, to lower the rod 128 and punch 131. During the upward-and-downward motion of the lever 152, due to the action of the cam 155, the roller 150 at the lower end of the vertical rod 128 simply rides upward and downward on the said lever 152.

The wrapper-carrier 136 is clearly illustrated in Figs. 4, 11, 13, and 16, and some of its details are specially illustrated in Figs. 8, 9, and 10.

The wrapper-carrier 136 is a plate conforming to the outline of the wrapper and rigidly secured upon the end of an oscillating arm 156, which is mounted in a sleeve 157 and is capable of an axial motion therein. The sleeve 157 is located at the left-hand side of the machine and close to the upper portion of the main supporting-frame thereof, as illustrated in Fig. 1, and said sleeve 157 is secured upon the upper end of a vertical shaft 158, to whose lower end is secured a beveled gear-wheel 159, which is in constant engagement with the beveled gear-wheel 160, the latter being secured upon the shaft 161, as clearly illustrated in Fig. 3, which shaft imparts motion, through the beveled gear-wheels 160 and 159, to the said shaft 158 and thence to the sleeve 157 and arm 156 for the purpose of moving the wrapper-carrier 136 from the position in which it is illustrated in Figs. 6 and 7 to a position directly over the rolling-apron 103, as shown in Figs. 11 and 19, and thence back to its former position (illustrated in Figs. 6 and 7) to receive another wrapper for conveying the same to the rolling-apron 103. The shaft 161 also transmits motion to the oscillating shaft carrying the pasting-brush, as hereinafter described. The shaft 161 receives its motion from the auxiliary driving-shaft 42 through the medium of the cam 162 on said shaft, the vertical rod 163, engaging at its lower end said cam, the crank-arm 164, secured to the upper end of said rod 163 and being itself rigid with the said shaft 161. A spring 165 retains the roller carried by the rod 163 constantly against the periphery of the cam 162. The revoluble motion of the shaft 42 and cam 162, aided by the spring 165, imparts a vertical reciprocation to the rod 163, and this, through the medium of the crank-arm 164, rocks the shaft 161, and thereby said shaft, through the intermeshing beveled wheels 159 160, is caused to axially oscillate the vertical shaft 158 and draw the sleeve 157 and wrapper-carrier arm 156 from the position in which the carrier 136 receives the cut wrapper to its position directly over the rolling-apron 103 and then back to its normal position ready to receive another wrapper. The oscillating motion of the wrapper-carrier arm 156 is thus effected from the auxiliary driving-shaft 42 through the cam 162, rod 163, crank-arm 164, shaft 161, bevel gear-wheels 160 159, vertical shaft 158, and sleeve 157. The shape of the cam 162 controls the movement of the cam-arm 164, connected with the shaft 161, and hence during a continuous movement of the said cam 162 the crank-arm 164, through the intermediate connecting parts, is enabled to move the wrapper-carrier 136 from the position in which it receives the cut wrapper to the position in which it delivers the same to the rolling-apron and then back to its normal position directly below the punch or die.

The wrapper-carrier 136 has in addition to its movement from the punch and die to the rolling-apron and then back to the punch and die a limited oscillating motion under the turning action of the arm 156 within the sleeve 157, and this axial oscillating motion of the carrier 136 and arm 156 is for the purpose of maintaining the carrier 136 in a horizontal position, as shown in Figs. 6 and 7, when it receives the cut wrapper, and of giving to said wrapper-carrier 136 an inclined position, as illustrated in Figs. 17 and 19, when it is delivering the cut wrapper to the rolling-apron 103 and is receding from the advancing pressure-roller 112.

The means for effecting the axial oscillation of the wrapper-carrier arm 156 to its horizontal position preparatory to the wrapper being delivered to the wrapper-carrier 136 is the cam 166, (see Fig. 16,) which during the outward movement of the wrapper-carrier arm 156 from the rolling-apron 103 engages the roller 167, carried by the collar 168 on the outer end of the said arm 156, and turns said roller 167 upward, as shown in Fig. 16, and thereby through the collar 168 causes the arm 156 to have a sufficient axial rotation to bring the carrier 136 into the horizontal position shown in Figs. 6 and 7. During the outward movement of the arm 156 the roller 167 merely rides up the cam 166 to bring the carrier 136 into its horizontal position and there maintain it until the carrier 136 receives the cut wrapper and starts on its inward movement to deliver the same to the rolling-apron, at which time the roller 167 will ride down the cam 166 and permit the arm 156 to turn axially in a reverse direction and move the carrier 136 into its inclined position. Upon the arm 156 is also secured the collar 169, carrying the roller 170, which is adapted to ride upon the plate 171, provided for it adjacent to the right-hand side frame of the machine, as shown in Figs. 4 and 13.

The plate 171 answers the purpose of a tramway for the roller 170; but when the arm 156 is fully at its outward position the roller 170 is slightly elevated, owing to the engagement of the roller 167 with the cam 166. When the arm 156, however, starts inward with the cut wrapper, the roller 167 will ride down the cam 166 and slightly turn the wrapper-carrier 136 downward, said cam 166, by lowering the roller 167, causing a slight axial motion in the said arm 156. As soon as the roller 167 has reached the lower part of the cam 166 the above-mentioned roller 170 will contact with the upper surface of the plate or tramway 171 and will during the inward motion of the wrapper-carrier 136 ride on said plate or tramway. Thus during the time when the wrapper-carrier 136 is directly below the punch 131 it will be held in a horizontal position, as shown in Figs. 6 and 7, to receive the cut wrapper, and when the wrapper-carrier 136 starts inward to deliver the cut wrapper to the rolling-apron 103 the roller 167 will ride down the cam 166 and permit the wrapper-carrier proper to be tilted downward and inward on an inclined position, as indicated in Fig. 17. The contact of the roller 170 with the tramway or plate 171, which has a horizontal upper surface, will maintain the wrapper-carrier proper, 136, in its inclined position until the inner lower edge of said wrapper-carrier 136 is directly over the forward edge of the pocket 109 in the apron 103. As soon as the wrapper-carrier 136 is in its position directly over the forward edge of the pocket 109 in the apron 103 the roller 170 will have passed over the edge of the tramway 171 and rest upon the projection 172, secured to the hinged bar 173, and which projection has its upper surface on a level with the upper surface of the plate or tramway 171. The purpose of the hinged bar 173 is to impart a sudden downward motion to the roller 170 at the time that the lower inner edge of the carrier 136 is directly over the forward portion of the pocket 109 in the apron 103, in order that the edge of the wrapper 138 overhanging the carrier 136 may be suddenly projected into the upper forward portion of the said pocket 109. When the carrier 136 is at its inward position over the rolling-apron 103 and the roller 170 is on the projection 172 of the bar 173, the slides 115 start forward with the pressure-roller 112 to close the pocket 109 in the rolling-apron 103, and in doing so carry from below the roller 174, (see Figs. 13 and 11,) at the outer end of the bar 173, the support 175, as shown in Fig. 11, at which time said bar 173, being unsupported, will immediately fall downward to the stop 176, (see Fig. 12,) whereby the roller 170 is caused to suddenly descend and turn the arm 156, so that the lower edge of the carrier-plate 136 and the wrapper 138 thereon may reach downward to the pocket 109 in the rolling-apron 103, as shown in Fig. 17, the lower edge of the wrapper 138 projecting directly into said pocket.

The support 175 is secured to the slide 115 in order that when the pressure-roller 112 is at its rear position said slide may support the free end of the bar 173 and thereby maintain the roller 170 in its upward position upon the projection 172 of said bar 173 and in order also that when the pressure-roller 112 moves forward to close the pocket 109 in the apron 103 the said support 175 may pass from below said bar 173 and effect the sudden descent of the lower edge of the wrapper into the upper forward portion of the pocket 109. In Fig. 14 the bar 173 is shown in its upper position and in Fig. 12 said bar is shown in its lower position. Upon the return movement of the pressure-roller 112 to its rear position after having rolled a cigarette the support 175 will again pass below the roller 174 of the bar 173 and elevate the latter to its upper position. (Shown in Fig. 14.) During the forward movement of the pressure-roller 112 the wrapper-carrier 136 recedes from said pressure-roller, as shown in Fig. 19, and during the receding motion of the wrapper-carrier 136 to its normal position and in advance of the pressure-roller 112 the roller 170 returns along the plate or tramway 171, which allows said carrier 136 to move closely along the upper forward surface of the rolling-apron 103, as shown in Fig. 19. When the bar 173 falls to its lower position by the removal of the support 175 therefrom, it falls on the stop 176, which is clearly shown in Figs. 12 and 14, and this stop is made adjustable, so as to regulate the depth to which the wrapper-carrier 136 shall descend. By adjusting the stop 176, and thus regulating the descent of the wrapper-carrier 136, just the desired extent of the wrapper 138 may be permitted to enter the mouth of the pocket 109.

The wrapper-carrier 136, secured upon the outer end of the arm 156, is, as above described, a plate rigidly secured to said arm 156 and conforming substantially to the outline of the wrapper 138. The carrier 136 is provided at its opposite ends with the shafts 185 and 186, upon which, as clearly illustrated in Figs. 6, 7, 8, 9, 10, and 13, are rigidly secured the metal clips 187, adapted to hold the opposite end edges of the cut wrapper 138, as shown in Fig. 13, during the travel of the carrier 136 from the punch and die to the rolling-apron. Upon the shaft 186 is secured the plate 188, having the crank-arm 189, as clearly illustrated in Fig. 8, and upon the other shaft 185 is secured the disk plate 190, which is connected with the disk plate 188 by means of the rod 191. The clips 187 receive their motion in one direction from the crank-arm 189 and in the opposite direction by a spring 192. The clips 187 are in their open position (shown in Figs. 8 and 9) when the carrier 136 is below the punch 131 in order that they may not interfere with the placing of the wrapper 138 on said carrier 136 by the descending platen 137, and the clips 187 are at such time held in their open position by the contact of the cam 193 (see Figs. 6, 7, and 13) below the die 132, and against which cam the crank-arm 189, carried by the plate 188 on the shaft 185, moves during the concluding part of the outward motion of the wrapper-carrier arm 156. The contact of the crank-arm 189, extending from the shaft 186, causes said arm to turn said shaft and elevate the clip 187, carried thereby, and this movement of the shaft 186 and disk plate 188 thereon is communicated to the disk plate 190 and clip 187 on the shaft 185 through the medium of the connecting-rod 191. Thus during the concluding outward movement of the wrapper-carrier the cam 193, acting against the crank-arm 189, will open the clips 187 and maintain them in their open position until the arm 156 again starts inward to deliver the cut wrapper to the rolling-apron. As soon as the wrapper-carrier arm 156 does start inward to deliver the cut wrapper to the rolling-apron the crank-arm 189 will recede from the cam 193, and the spring 192 will then impart a reverse motion to the shafts 185 186 and clips 187 and close the latter upon the edges of the wrapper, as shown in Fig. 13, whereby the said wrapper will be maintained upon the carrier 136 during the inward movement of the latter to the rolling-apron. The spring 192 should have a light tension, so as not to rigidly bind the edges of the wrapper 138 upon the carrier 136. A light tension on the spring 192 will be sufficient to enable the clips 187 to hold the wrapper upon the carrier 136 and to enable the rolling mechanism while rolling the cigarette to gradually draw the wrapper from said carrier without other means being provided at the rolling-apron for elevating the clips 187. The wrapper-carrier 136 after receiving the wrapper starts on its inward motion with the cut wrapper and while moving inward to the rolling mechanism said wrapper-carrier gradually assumes the inclined position in which it is illustrated in Fig. 17 and comes to a stop at the rear edge of the rolling-bed 104, in which position the lower edge of the wrapper, which overhangs the edge of the carrier 136, protrudes slightly into the pocket 109 of the rolling-apron 103, as indicated in Fig. 17. The side frame of the machine is provided with a stop 193, as clearly shown in Figs. 11, 13, and 16, to arrest the wrapper-carrier at its inward movement in order that the edge of the cut wrapper may at all times be directly delivered within the edge of the pocket 109 of the rolling-apron 103. When the wrapper-carrier 136 has arrived at the position for the delivery of its wrapper, as indicated in Figs. 11 and 17, the pasting brush or roller 194, hereinafter more fully described, will come to a position to apply a line of paste at the then upper edge of the wrapper held upon the carrier 136, as shown in Figs. 11 and 17, and then the paste brush or roller 194 will return to its former position out of the way and the carrier 136 will gradually recede to its former position below the punch and die as the pressure-roller 112 advances along the rolling-bed 104 to roll the cigarette and causes the apron 103 to draw the wrapper 138 from the said carrier. The movement of the pasting brush or roller 194 to its normal position and the receding motion of the wrapper-carrier 136 in advance of the pressure-roller 112 is shown in Fig. 19, and this feature will be more fully referred to in the description of the operation of the machine to be given hereinafter.

The pasting roller or brush 194 is mounted upon an oscillating arm or shaft 195, as shown in Figs. 4, 11, and 13, and when in its normal position is in contact with the length of the roller 196, as shown in Fig. 4, which revolves within the paste-receptacle 197. The roller 196 has a revolving motion within the box or receptacle 197 and its inner side projects through an opening in said box or receptacle in order that the pasting brush or roller may contact with it. During the operation of the machine the roller 196 and the paste brush or roller 194 have a revolving motion when they are in close relation to one another, as shown in Fig. 4, and hence the brush or roller 194 will receive a uniform layer of paste. The roller 196 in the paste-receptacle 197 receives its motion through the beveled gear-wheels 198 199, (see Figs. 2 and 4,) pulley-wheel 200, cord or belt 201, pulley-wheel 202, and shaft 81, which shaft 81, as shown in Fig. 1, receives its motion from the main driving-shaft 41 through the medium of the pulley-wheel 82 on said shaft, belt or cord 83, and pulley-wheel 84, the latter being directly on said shaft 41. During the motion of the shaft 41 the roller 196 in the paste-receptacle 197 will have a continuous revolving motion.

The shaft 195, carrying the brush or roller 194, is mounted at its end in the sleeve 203 and carries a gear-wheel 204. The sleeve 203 is secured by a collar 205 upon the upper end of the vertical shaft 206, as clearly illustrated in Figs. 2, 11, and 13, which extends downward, as shown in Fig. 2, and carries at its lower end the beveled gear-wheel 207, which is in constant engagement with the beveled gear-wheel 208, secured upon the rock-shaft 161, hereinbefore referred to and more clearly illustrated in Fig. 3. The motion of the shaft 161 is communicated through the beveled gear-wheels 207 and 208 to the vertical shaft 206 and through said shaft to the shaft 195, carrying the pasting-roller 194, whereby the latter is given its oscillating motion from the normal position in which it is shown in Figs. 4 and 13 to its inward position shown in Fig. 11 and then back to its normal position shown in Fig. 4.

The mechanism for actuating the rock-shaft 161 has been hereinbefore specifically referred to and in connection with the description of the wrapper-carrier 136 and means for imparting to said carrier its oscillating motion. When the pasting-roller 194 is at its inward position, (shown in Figs. 11 and 17,) said pasting-roller is given a limited revoluble motion in order that it may be enabled to move its surface over the edge of the cut wrapper 138 then held upon the carrier 136, and this revoluble motion is imparted to the pasting-roller 194 by means of the gear-wheel 204 on the shaft 195 of said pasting-roller 194, the vertical rod 209, having teeth at its upper end to engage said gear-wheel 204, as shown in Fig. 5, and the step 210, which supports the lower end of said vertical rod 209 and which, as shown in Figs. 2 and 5, is directly connected with the vertically-reciprocating rod 125, which is utilized for the revolving of the shaft or roller 111 for winding up and slackening the apron 103. When the vertical rod 125 is actuated to wind up the apron 103 for the purpose of drawing the pocket 109 therein down to proper size, the said rod 125 will at the same time move the step 210 and vertical rod 209 upward, causing the teeth at the upper end of the rod 209 to engage and revolve the gear-wheel 204 and with the latter the shaft 195 and pasting-roller 194, the latter being thus caused to revolve against the upper edge of the wrapper held on the carrier 136 and to apply the proper strip of paste to said wrapper. When the pasting-roller 194 is in its normal position against the paste-receptacle 197, the gear-wheel 204 is removed from the rod 209, and hence at such time the gear-wheel 204 is entirely idle. When, however, by means of the vertical rod 206, driven from the rock-shaft 161, the pasting-roller 194 is oscillated or moved to its inward position, (shown in Figs. 11 and 17,) the gear-wheel 204 is brought directly against the upper toothed portion of the vertical rod 209, and thus the rod 209, under the action of the step 210 and rod 125, may conveniently revolve the said gear-wheel 204 and pasting-roller 194. As soon as the pasting-roller 194 has applied the necessary line of paste to the wrapper 138 it will, as indicated in Fig. 19, recede to its former normal position against the paste-receptacle 197, where it will be acted upon by the roller 196 and kept constantly supplied with an even layer of the paste.

Upon the return of the pasting-roller 194 to its normal position against the roller 196 in the paste-receptacle 197 the pressure-roller 112 will have advanced along the rolling-bed 104 and closed the then already-reduced pocket in the rolling-apron 103 against the lower edge of the wrapper 138, projecting into said pocket, and the pressure-roller 112 then advancing along the rolling-bed 104 (without any further reduction in the size of the pocket or bight in the said rolling-apron 103) will roll the cigarette, while at the same time the wrapper-carrier 136 is retreating to its normal position in advance of said pressure-roller. The pressure of the roller 112 during the advance movement of said roller causes the apron 103 to gradually draw the wrapper 138 from the wrapper-carrier 136, and the said roller at the extreme of its forward movement discharges the cigarette from over the front end of the bed-plate 104 and upon the cigarette chain carrier 211, which is a sprocket-chain of known construction, forming pockets to carry the cigarettes downward from the rolling-bed 104 and mounted upon the sprocket-wheels, as indicated in Figs. 1, 2, 5, 19, and 20, said sprocket-wheels being in pairs and secured upon the shafts 212 and 213. (Shown enlarged in Figs. 19 and 20.) The cigarette chain carrier 211 has an intermittent motion imparted to it by means of the ratchet-wheel 313 on the said shaft 212, the spring-pawl 214, engaging said ratchet, the pivoted arm 215, carrying said pawl and swung from the shaft 212, and the arm 216, which, as shown in Figs. 2 and 5, is directly connected with the rocking arm 118, which, through the medium of the arms 117, reciprocate the pressure-roller 112. The rocking arm 118 during its forward motion toward the front of the machine effects the rolling of the cigarette and the discharge of the same from the rolling-apron into the carrier-chain 211, and upon its reverse motion toward the rear of the machine the said arm 118 actuates the pawl 214 to drive the ratchet 313 and through said ratchet the shaft 212 and carrier 211. Thus the arm 118 going forward effects the rolling of the cigarette and the discharge of the same to the carrier 211 and upon its reverse motion imparts a sufficient motion to the chain 211 to cause the intermittent downward travel of the completed cigarettes by means of said chain 211 to the cutters, by which the ends of said cigarettes are trimmed.

The traveling chain 211 delivers the cigarettes one after another to the hook-shaped stationary cutters 217, which coöperate with the movable cutters 218 in the trimming of the ends of the cigarettes. The cutters 218 are mounted upon the rock-shaft 219, and the latter is actuated to move the cutters 218 from the position in which they are indicated by full lines in Fig. 20 to the position in which they are indicated by dotted lines in said figure. The cutters 218 are normally in their rearward position (shown by full lines in Fig. 20) and move forward against the cigarette held by the stationary cutters 217. The cutters 218 receive their movement from the rock-shaft 219, and this rock-shaft has upon its end the crank-arm 220, which is pivotally connected to the upper end of the pitman-rod 221, the lower end of the latter being secured to the crank-arm 222, secured to the rock-shaft 161. The rock-shaft 161 receives its movement from the auxiliary driving-shaft 42, as above described, and said shaft 161 not only effects the movement of the wrapper-carrier 136 and the paste-brush 194, but also, as above indicated, effects, through the crank-arm 222, rod 221, and crank-arm 220, the oscillation of the rock-shaft 219 and the movement therewith of the cutters 218. After the cutters 218 have moved forward to the position shown by dotted lines in Fig 20 and cut off the ends of the cigarette held by the hook-shaped cutters 217 the trimmed cigarette will fall between the cutters 217, and the trimmed ends removed by the cutters 218 will fall from the outer sides of the said cutters 217.

The operation of the machine hereinbefore described will be largely understood from the foregoing part of this specification, in which the details of construction and the operation of the moving parts have been fully explained. It would seem unnecessary to refer to the shafts and levers by which the various parts of the machine receive their motion from the driving-shafts, since these features of the machine have been fully described hereinbefore. The filler-tobacco is spread upon the endless belt 57 in a well-known manner and fed inward between the rollers 59 and 61. The protruding portion of the filler-tobacco fed through the space between the rollers 59 and 61 is thoroughly disintegrated by the picker-roller 62 and falls downward to the charge-box 65, which conveys the same to the rolling-apron 103. The charge-box 65, as above described, is carried by the oscillating arm 90, whose movement is controlled by the cam 92, upon which it rests. When the charge-box 65 descends, the apron 103 is in a slackened condition and extends over the rolling-bed 104 and rod or shaft 110 to the revoluble take-up roller 111. The descending charge-box forms the pocket 109 in the slackened apron 103 and deposits the charge of filler-tobacco in said pocket 109, as shown in Fig. 13, the door 98 of the charge-box 65 being opened by the contact of the cam 105 and crank-arm 102, the latter being on the end of the shaft 99, carrying said door 98. The lower edge of the charge-box passes below the upper surface of the rolling-bed 104 and has the flange 97, which directly contacts with the apron 103 and forms a substantial pocket 109 therein for the filler-tobacco. When the door 98 of the charge-box 65 is open, as shown in Fig. 23, the notched plate 106 on the shaft 99 will be engaged by the bent end of the spring 107 and lock said door in its open position, thus insuring the full discharge of the filler-tobacco from the box. During the upward movement of the charge-box 65 from the rolling-apron the door 98 is held in its open position by the spring 107 and the notched plate 106 until the crank-arm 102 strikes the cam-arm 101, as shown in Fig. 21, and forces the notched plate 106 from the spring 107. After the charge-box 65 ascends from the rolling-apron 103 the wrapper-carrier 136 will start onward with the cut wrapper 138 and will after having traveled onward a short distance be turned to an inclined position by the downward movement of the roller 167 along the cam 166, in which inclined position the lower edge of the wrapper-carrier 136 and the wrapper 138 will move in close proximity to the upper surface of the rolling-apron 103 until said carrier comes to a stop at the front edge of the pocket 109 in said apron. During the inward motion of the carrier 138 with the cut wrapper the pasting-brush 194 will start inward to meet the wrapper-carrier 136 and upon arriving into contact with the upper edge of the wrapper 138, as shown in Fig. 11, has a limited revoluble motion in the direction of the arrow shown in Fig. 17 and will apply a line of paste to the upper edge of said wrapper, after which the pasting-roller 194 will return to its normal position (shown in Fig. 4) and the pressure-roller 112, carried by the slides 115, will start forward and close the pocket 109. During the forward movement of the pressure-roller 112 to close the pocket 109 the support 175, carried by the slide 115, will leave the bar 173 and permit the roller 170 on the arm 156 of the wrapper-carrier to suddenly drop, thereby causing the descent of the lower projecting edge of the wrapper 138 into the forward portion of the pocket 109. When the pressure-roller 112 has moved forward and closed the pocket 109, it will temporarily cease moving and the take-up roller 111 will revolve and wind up the rear end of the apron 103, in order to draw the pocket or loop 109 down to the proper predetermined size, after which the roller 111 will remain at rest and the pressure-roller 112 will resume its forward movement and roll the cigarette, discharging the latter upon the carrier 211. The pocket or loop 109 in the rolling-apron 103 is reduced to proper size before the cigarette is rolled in the bight of said apron upon the rolling-bed, and said bight as it rolls on said bed is not reduced. During the forward travel of the pressure-roller 112 the lower edge of the wrapper 138 is caught between the folds of the rolling-apron 103 under the action of said pressure-roller 112, and hence said wrapper will be drawn into the pocket of the apron 103 and be wound around the filler-tobacco. The wrapper 138 is gradually drawn from the wrapper-carrier 136 and from beneath the clips 187 of said carrier while said clips are in their closed position, as illustrated in Fig. 19, the carrier 136 gradually moving in advance of the pressure-roller 112 close to the upper surface of the rolling-bed 104.

The operation of the means for cutting the wrappers has been fully described hereinbefore, and a further description of this feature of the machine will not be required. Attention, however, is directed to the fact that the cut wrapper 138 has its edge overhanging the inner edge of the wrapper-carrier plate 136, as illustrated in Fig. 7, and that the wrapper-carrier plate is slightly less in width than the width of the die 132, whereby the cut wrapper when depressed by the platen 137 at its inner edge extends inward beyond the inner edge of the wrapper-carrier plate 136. This inwardly-extending portion of the wrapper 138 is the part of the wrapper which, by the means hereinbefore described, is projected into the upper forward portion of the pocket or loop 109, formed in the rolling-apron.

The operation of the pasting-brush 194 and the mechanism for actuating the same has been hereinbefore described. The said pasting-brush 194 has a motion from the paste-receptacle 197 to the wrapper-carrier 136 at the time said carrier is directly over the rolling-apron 103. The pasting-brush 194 has a revoluble motion while in its normal position against the roller 196 in the paste-receptacle 197, and also has a revoluble motion when in contact with the upper edge of the wrapper held upon the wrapper-carrier directly over the rolling-apron.

The operation of the chain carrier 211 has been explained above, said chain carrier having simply an intermittent motion for the purpose of receiving the cigarettes from the rolling-apron 103 and carrying them downward to the trimming-knives 217 and 218. With each intermittent motion of the chain carrier 211 one cigarette is delivered to the knives 217, and said cigarette is trimmed by the upward and forward movement of the knives 218.

The invention is not limited to all of the details of construction hereinbefore described, since many of the parts may be modified without departing from the scope of the invention as claimed.

What I claim as my invention, and desire to secure by Letters Patent, is—

1. In a machine of the character described, the rolling-apron, the pressure-roller therefor, mechanism for feeding the filler-tobacco, the charge-box for conveying the charges of filler-tobacco from said feeding mechanism to said rolling-apron, and means for moving said charge-box between said feeding mechanism and said apron, said charge-box having the converging sides one of which constitutes the door 98, combined with the shaft 99 carrying said door, the crank-arm 102 on said shaft, the spring 100 flexed against said door, the cam 105 for acting upon said crank-arm 102 to open said door when said charge-box is arriving at its lower position, means for maintaining said door in its open position during the ascent of said charge-box, and means for closing said door when said charge-box is arriving at its upper position; substantially as set forth.

2. In a machine of the character described, the rolling-apron, the pressure-roller therefor, mechanism for feeding the filler-tobacco, the charge-box adapted to move between said feeding mechanism and said apron to deliver the charges of filler-tobacco to the latter, and means for effecting the movement of said charge-box between said feeding mechanism and said apron, said charge-box having the door 98, shaft 99 carrying said door, the spring 100 flexed against said door, the notched plate 106 on said shaft, the spring 107 engaging said notched plate, and the crank-arm 102 on said shaft, combined with the cam 105 to engage said crank-arm 102 when the charge-box is in its lower position, and the stationary arm 101 to engage said crank-arm when said charge-box is in its upper position; substantially as set forth.

3. In a machine of the character described, the rolling-apron, the pressure-roller therefor, mechanism for feeding the filler-tobacco, and the charge-box for conveying the charges of filler-tobacco from said feeding mechanism to said rolling mechanism, said charge-box having downwardly-converging sides, one of which constitutes a door, combined with the arm 90 carrying said charge-box and pivotally secured at its rear end, the rock-shaft 93 below said arm 90, the cam 92 carried on said rock-shaft and upon which said arm 90 rests, and means intermediate said rock-shaft 93 and the driving-shaft for actuating said cam 92 to raise and lower said arm 90 with the charge-box carried thereby; substantially as set forth.

4. In a machine of the character described, the rolling-apron, the pressure-roller therefor, and feed mechanism for feeding the filler-tobacco, said mechanism comprising the endless feed-belt mounted upon rollers, the pressure-roller 61, the revoluble picker-roller 62, the hood 63 covering said rollers 61 and 62, and the chute 64 extending downward from said hood, combined with the charge-box adapted to receive the filler-tobacco from said chute and deliver the same to said rolling-apron and provided with a hinged door, the longitudinal arm 90 extending below the feed-belt for filler-tobacco and pivoted at its rear end, the transverse rock-shaft 93 below said arm 90, the cam 92 secured upon said rock-shaft and directly receiving said arm 90, the crank-arm 94 on said rock-shaft and means intermediate said crank-arm 94 and the driving-shaft for operating said rock-shaft and said cam to effect the movement of the arm 90 and said charge-box; substantially as set forth.

5. In a machine of the character described, the rolling-apron, the pressure-roller therefor, mechanism for feeding the filler-tobacco, the charge-box for conveying the charges of filler-tobacco from said feeding mechanism to said rolling-apron, and means for moving said charge-box between said feeding mechanism and said apron, said charge-box having the converging sides, one of which constitutes the door 98 and the other of which is provided with the downwardly-projecting flange 97 to form the pocket in said rolling-apron, combined with the spring acting to hold said door closed, means for opening said door when said charge-box is arriving at its lower position, means for retaining said door open during the ascent of said charge-box, and means for closing said door when said charge-box is arriving at its upper position; substantially as set forth.

6. In a machine of the character described, the rolling-apron, the bed 104 for said apron, the rod 110 located in the rear of said bed 104 and over which the said apron passes, side frames 114 at opposite sides of said bed 104, the slides 115 moving along said side frames 114, the pressure-roller 112 carried by said slides 115 and means for moving said slides from the driving-shaft, said slides first moving to close the pocket or loop in the rolling-apron, then temporarily stopping and then resuming their forward movement to roll the cigarette, combined with means connected with said apron for drawing the pocket or loop therein down to size after said pressure-roller has closed said pocket or loop and temporarily ceased to move, the wrapper-carrier adapted to receive the cut wrapper, means for moving said carrier inward to the forward edge of the pocket in said rolling-apron, means for turning said carrier to project the lower inner edge of the wrapper into the forward edge of the pocket in the rolling-apron prior to the closing of said pocket by said pressure-roller, the charge-box for feeding the charges of filler-tobacco to said apron, and means operated from the driving-shaft for moving said charge-box and causing the latter to descend into the space between the said rolling-bed 104 and rod or shaft 110 to form the pocket or loop in said apron; substantially as set forth.

7. In a machine of the character described, the driving-shaft, the punch operable therefrom, the platen within said punch, means for driving said platen downward below said punch when the latter has cut the wrapper and is at its lowest position for the purpose of delivering said wrapper in smooth condition upon the wrapper-carrier, and the open die receiving the leaf and coöperating with said punch in the cutting of the wrapper, combined with the wrapper-carrier, the rolling mechanism, means for maintaining said carrier below said open die and at a suitable elevation to receive the cut wrapper when driven downward by said platen, and means for moving said carrier from below said open die to the rolling-apron to deliver the cut wrapper to said apron; substantially as set forth.

8. In a machine of the character described, the driving-shaft, the punch operable therefrom, the platen within said punch, means for driving said platen downward below said punch when the latter has cut the wrapper and is at its lowest position for the purpose of delivering said cut wrapper in smooth condition upon the wrapper-carrier, and the open die receiving the leaf and coöperating with said punch in the cutting of the wrapper, combined with the rolling mechanism, the wrapper-carrier movable from said die to the rolling-apron for conveying the cut wrappers to said apron, means for moving said carrier, and means for tilting the carrier for projecting the edge of the wrapper overhanging said carrier into the pocket of said apron; substantially as set forth.

9. In a machine of the character described, the rolling-apron, the pressure-roller therefor and means connected with said apron for drawing the pocket or loop therein down to proper size, combined with the wrapper-carrier, the clips at the opposite ends of said carrier for holding the wrapper thereon, means for operating said clips, means for moving said carrier inward to the upward forward edge of the pocket or loop in said apron, and means actuated by the rolling mechanism for tilting the carrier for projecting the overhanging edge of said wrapper into said pocket during the movement of said pressure-roller to close said pocket; substantially as set forth.

10. In a machine of the character described, the rolling-apron, the pressure-roller therefor, means connected with the end of said apron for drawing the pocket or loop therein down to size, and means for operating said pressure-roller from the driving-shaft, combined with the oscillating wrapper-carrier arm 156, the wrapper-carrier 136 upon said arm, the clips at the opposite ends of said carrier 136 for holding the wrapper, the shafts 185 and 186 carrying said clips, the plates 188 and 190 carried by said shafts, the rod 191 connecting said plates, the spring 192 maintaining said clips in their closed position, the cam 193 for opening said clips to receive the wrapper, and means for moving said wrapper-carrier inward to deliver the wrapper to said rolling-apron; substantially as set forth.

11. In a machine of the character described, the rolling-apron, the pressure-roller therefor and means for actuating said roller from the driving-shaft, combined with the horizontally-oscillating wrapper-carrier arm 156, the wrapper-carrier 136 on said arm, the sleeve 157 in which said arm is loosely mounted, the roller 167 on said arm, the cam 166 engaging said roller, the roller 170 also on said arm, the tramway 171 receiving said roller 170 whereby the carrier is inclined, and means for actuating said sleeve 157 to oscillate said arm 156 and carrier 136; substantially as set forth.

12. In a machine of the character described, the rolling-apron, the pressure-roller therefor, and means for operating said roller from the driving-shaft, combined with the wrapper-carrier arm 156, the wrapper-carrier 136 on said arm, the sleeve 157 receiving said arm, means for causing said arm to move inward to deliver the wrapper to the rolling-apron, and means for turning said arm within said sleeve in order to incline said carrier 136 and project the lower edge of the cut wrapper into the pocket of the rolling-apron; substantially as set forth.

13. In a machine of the character described, the rolling-apron, the pressure-roller therefor, and means for actuating said roller from the driving-shaft to roll the cigarette in the apron, combined with the wrapper-carrier arm 156, the wrapper-carrier 136 on said arm, means for oscillating said arm to move said carrier 136 inward to the pocket of the rolling-apron, and means for then turning said arm 156 axially and projecting the lower edge of the cut wrapper into said pocket; substantially as set forth.

14. In a machine of the character described, the rolling-apron 103, the pressure-roller therefor and means for actuating said pressure-roller from the driving-shaft, combined with the wrapper-carrier arm 156, the wrapper-carrier 136 on said arm, the sleeve 157 loosely receiving said arm, means connected with said sleeve for moving said arm and said carrier 136 inward to the rolling-apron, means for maintaining said wrapper-carrier in an inclined position during its inward travel to the pocket of the rolling-apron and means for imparting an axial motion to said arm 156 when the carrier 136 is at the forward edge of the pocket in said apron and thereby projecting the edge of the wrapper into said pocket; substantially as set forth.

15. In a machine of the character described, the rolling-apron, the pressure-roller therefor, and means for actuating said roller from the driving-shaft, combined with the wrapper-carrier arm 156, the wrapper-carrier 136 on said arm, the sleeve 157 loosely receiving said arm, the roller 170 on said arm, the tramway 171 over which said roller travels with said carrier 136 in an inclined position, the bar 173 supporting said roller 170 when the carrier 136 is at its inward position and means for removing the support from said bar 173 when said carrier is over the forward portion of the pocket in the rolling-apron and it is desired to close said pocket; substantially as set forth.

16. In a machine of the character described, the rolling-apron, the pressure-roller therefor, the slides 115 carrying said roller, the support 175 carried by one of said slides, and means for operating said slides from the driving-shaft, combined with the oscillating arm 156, the wrapper-carrier 136 on said arm, the sleeve 157 in which said arm is loosely mounted, means for oscillating said sleeve to effect the movement of said arm 156 and carrier 136 to the apron, the roller 170 on said arm 156, the tramway 171 supporting said arm 170, the bar 173 receiving said roller 170 after the latter leaves said tramway 171, and the stop 176 for said bar 173 when the latter is relieved of its support 175 by the inward motion of said pressure-roller; substantially as set forth.

17. In a machine of the character described, the rolling-apron, the pressure-roller therefor, and means for actuating said roller from the driving-shaft, combined with the horizontally-oscillating arm 156, means for horizontally oscillating said arm 156, the wrapper-carrier 136 on said arm, means for maintaining said carrier 136 in a horizontal position when said carrier is at its outward position, means for inclining said carrier 136 during its inward travel to the rolling-apron, and means for projecting said carrier downward to deliver the overhanging edge of the wrapper into the pocket of the rolling-apron when said carrier is at its extreme inward position; substantially as set forth.

18. In a machine of the character described, the punch for cutting the wrappers and operable from the driving-shaft, the die below said punch, the wrapper-carrier below said die to receive the cut wrappers, the clips at the ends of said carrier, means for maintaining said clips in an open position when the carrier is below said die, and means for closing said clips upon the opposite ends of the wrapper when said carrier leaves said die, combined with the rolling-apron, the pressure-roller therefor, means for reciprocating said roller, and means for moving said carrier from the die to the pocket of the rolling-apron in order to deliver the cut wrapper to the latter; substantially as set forth.

19. In a machine of the character described, the punch for cutting the wrappers and operable from the driving-shaft, the platen within said punch, the rod supporting said platen and extending upward through the plunger-rod of said punch, the pivoted lever connected to the upper end of the platen-rod, the spring imparting an upward tension to said platen-rod, the support for said lever connected with the punch-rod, the stop to engage the outer end of said lever upon the descent of the punch for the purpose of driving the platen below the punch, and the die below said punch, combined with the rolling-apron, the pressure-roller therefor, the wrapper-carrier adapted to travel from said die to said apron to deliver the cut wrappers to the latter, and means for moving said carrier; substantially as set forth.

20. In a machine of the character described, the punch for cutting the wrappers and operable from the driving-shaft, and the open die below said punch and through which the cut wrappers are driven, combined with the rolling-apron, the reciprocating roller therefor, the wrapper-carrier adapted to convey the cut wrappers from said die to said apron, and means for moving said carrier from said die to said apron, said means arresting said carrier on its inward movement at the front edge of the pocket in the rolling-apron and on its outward movement in a position with respect to said die to permit one edge of the wrapper to overhang the edge of said carrier; substantially as set forth.

21. In a machine of the character described, the rolling-apron, the reciprocating roller therefor, means for reciprocating said roller, the wrapper-carrier adapted to convey the cut wrappers inward to said rolling-apron, and means for actuating said carrier, combined with the pasting-brush, and the shaft upon which said brush is mounted and which is pivotally secured at one end, combined with the gear-wheel on said shaft, the vertical rod having teeth to engage said gear-wheel when said brush is at its inward position over the rolling-apron, and means for moving said rod against said gear-wheel for the purpose of revolving said brush while at its inward position; substantially as set forth.

Signed at New York, in the county of New York and State of New York, this 15th day of July, A. D. 1897.

JULIUS H. SCHMIDT.

Witnesses:
CHAS. C. GILL,
E. JAS. BELKNAP.